United States Patent [19]

Sommer

[11] Patent Number: 4,843,880

[45] Date of Patent: Jul. 4, 1989

[54] METHOD FOR MEASURING THE DIRECTION AND FORCE OF GASEOUS OR LIQUID FLOWS AND PROBE FOR CARRYING OUT THIS METHOD

[76] Inventor: Roland Sommer, Kronthaler Weg 15, 6231 Schwalbach/Taunus, Fed. Rep. of Germany

[21] Appl. No.: 219,838

[22] Filed: Jul. 8, 1988

Related U.S. Application Data

[63] Continuation of Ser. No. 938,989, Dec. 8, 1986, abandoned, which is a continuation-in-part of Ser. No. 920,981, Sep. 9, 1986, Pat. No. 4,750,356.

[30] Foreign Application Priority Data

Jan. 14, 1985 [DE] Fed. Rep. of Germany ........ 3500988
Dec. 9, 1985 [DE] Fed. Rep. of Germany ........ 3543431
Feb. 12, 1986 [JP] Japan ........................... 3604335

[51] Int. Cl.$^4$ .................. G01W 1/04; G01C 23/00
[52] U.S. Cl. ........................... 73/189; 73/180; 73/182
[58] Field of Search ............... 73/180, 182, 188, 189, 73/861.65

[56] References Cited

U.S. PATENT DOCUMENTS

| | | | |
|---|---|---|---|
| 2,487,414 | 11/1949 | Baxter | 73/180 X |
| 2,789,433 | 4/1957 | Goudy | 73/861.65 |
| 2,971,375 | 2/1961 | Fieldgate | 73/180 |
| 3,355,946 | 12/1967 | Lazell | 73/861.65 |
| 4,437,343 | 3/1984 | Dixon et al. | 73/182 |
| 4,522,070 | 6/1985 | Hagen | 73/182 X |

FOREIGN PATENT DOCUMENTS 534244 9/1931 Fed. Rep. of Germany ........ 73/182

Primary Examiner—Charles A. Ruehl
Attorney, Agent, or Firm—Lorusso & Loud

[57] ABSTRACT

Disclosed is a method and probe for measuring the direction and force of gaseous of liquid flows in which two dynamic pressures are measured which are built up in two measuring chambers under the influence of the flow at a certain free-stream angle or a plurality of dynamic pressures are measured which build up in a plurality of measuring chambers under the influence of the flow at a certain free-stream angle, and wherein from the difference or the quotient of measured dynamic pressures or from absolutely or vectorially added measured values, the direction and/or the force of the flow is determined through mathematic processing. The measuring chamber openings are rectangular-shaped or slot-shaped, the center lines of a pair of measuring openings are positioned in a plane, and the arrangement of the measuring chamber openings relative to each other is fixed. The probe can also be used to measure the force of the flow. In one embodiment, the chambers are essentially located along an arc or along the periphery of a circle in which under the influence of currents, dynamic pressures are formed in the chambers.

9 Claims, 16 Drawing Sheets $t_1$ = VELOCITY = P
$t$ = TEMP. COMPENSATION $$P = \frac{U^2}{R} \cdot \frac{t_1}{t_2}$$

METHOD FOR MEASURING THE DIRECTION AND FORCE OF GASEOUS OR LIQUID FLOWS AND PROBE FOR CARRYING OUT THIS METHOD

CROSS-REFERENCE TO RELATED APPLICATION

This is a continuation of co-pending application Ser. No. 938,989 filed on Dec. 8, 1986, now abandoned, which was a continuation-in-part of U.S. patent application Ser. No. 920,981, filed Sept. 9, 1986, now U.S. Pat. No. 4,750,356.

BACKGROUND OF THE INVENTION

The invention relates to a method for measuring the direction and force of gaseous or liquid flows, herein referred to as fluid flows or fluid currents for short, as well as to a probe which can be used in this method.

Many measuring instruments for measuring fluid flows and particularly wind measuring instruments are already known. The field of application for flow measuring instruments includes all fields in which flows are of importance, for example meteorology, aircraft, ships, motor vehicles, wind tunnel measurements and so forth. Even if the measuring problems differ from each other in detail, the fundamental requirement of the flow measuring instrument is, nevertheless, that this measuring instrument should disturb the flow to be measured as little as possible. In addition, the existence of moving parts in a measuring device is undesirable since the moving parts usually produce particularly strong disturbances of the flow and are generally not free from inertia and hysteresis effects. For this reason, problems previously occurred in this respect especially if the direction of a flow had to be measured. If, on the other hand, inertia or hysteresis effects of rotating parts on flow measuring instruments had to be reduced, the bearings of the rotating parts had to be improved which, in turn, led either to an increase in the weight of the measuring probe or made the measuring probe mechanically sensitive to jarring, shocks, vibrations and so forth. However, in rough operation on ships or in aircraft, neither heavy probes nor probes which are mechanically too sensitive can be used.

In the case of the measuring of a flow with aircrafts, helicopters or other flying objects, the direction of the airflow onto and around the flying object has to be measured, as well as the force of the flow and the velocity. For measurements of this kind, measuring probes are still used which rest on the Prandtl principle of the known pressure probes for measuring the static pressure, on the Pitot-tube, which is used to measure the sum of the dynamic pressure and the static pressure, and on the pressure tube. This latter pressure tube is essentially a Pitot-tube in combination with a necessary pressure probe for measuring the static pressure and permitting the determination of the dynamic pressure. Knowledge of the dynamic pressure is desirable, since from it the velocity of aircrafts, as well as their course may be determined.

The traditional measuring instruments, which rest on these principles, display various disadvantages. One of these is that the measuring range of the angle is relatively small on pressure tubes. With pressure tubes one may only achieve good measuring accuracy with impact angles up to 10 degrees. When, however, an aircraft, for example, takes off during strong air currents, when an accurate knowledge of the current conditions is especially important, the traditional pressure tubes often fail because they are blown upon from too slanted an angle. Furthermore, the determination of the static pressure is difficult because the air movements can falsify a predetermined altitude compensation, not taking into consideration, that such altitude compensation is expendable. Of course, it is therefore desirable to use a measuring probe with which such difficulties do not arise. In addition, to the great need for an improved probe in aeronautical applications, similar problems also exist with respect to navigational problems as well as problems in other fields in which fluid flows play a role and in which the flows must be measured such as in meteorology.

The present invention, therefore, has the object of creating a method for measuring gaseous or liquid flows, as well as a probe for use in this method, which can be used for measuring particularly the direction of the flow and also the force of the flow and which is lightweight, has no moving parts and can be constructed in a stream-lined manner so that it causes little disturbance of the actual flow to be measured.

Another object of the present invention is to provide a method, and a probe for use in the method, which utilizes a wide impact angle measuring range with which either dynamic pressures may be measured directly, without additionally having to determine the static pressure, or with which only static pressure is measured, if only static pressure is desired.

Still another object of the present invention is to provide a probe which is simple in construction yet functionally reliable and variously adaptable.

SUMMARY OF THE INVENTION

These objects are achieved by the method and probe of the present invention for measuring the direction and force of gaseous or liquid flows wherein:

(a) two dynamic pressures are measured which are built up in two measuring chambers under the influence of the flow at a certain free-stream angle and the difference or quotient of these dynamic pressures is determined and/or the difference of these dynamic pressures is measured directly, and the direction of the flow is determined from the difference or the quotient of said dynamic pressures, wherein the position of the two measuring chamber openings relative to each other is fixed, the measuring chamber openings are rectangular-shaped or slot-shaped, and the normals to the measuring chamber openings in the centers thereof are positioned in one plane, and the measuring openings of the two chambers being effective as scoops for measuring dynamic pressure for the flow are not equal to each other all over the total measuring range, or (b) several dynamic pressures are measured which are built up in a plurality of measuring chambers under the influence of the flow at a certain free-stream angle, and from differences or quotients or quotients of differences of dynamic pressures or from absolutely or, under consideration of the relative positions of the measuring points relative to one another, vectorially added measured values of dynamic pressures or differences of dynamic pressures, the direction and/or the force of the flow is determined by mathematical processing of said measured values, the position of the measuring chamber openings relative to one another being fixed and the measuring chamber openings being rectangular-shaped or slot-shaped and the chambers being directed into different directions, or (c) two dynamic pressures are measured by a probe which contains at least two externally open measuring chambers with an equally effective dynamic pressure opening facing each other about the axis of symmetry in such a way that their measuring openings face in opposite directions so that the measuring devices for determining the pressures in the measuring chambers and/or the pressure differences between the measuring chambers are provided in the rear of the measuring chambers. In a preferred embodiment four measuring chambers are provided, of which two face each other about the axis of symmetry and the other two, also face each other about the axis of symmetry and are arranged essentially perpendicular to the first pair of measuring chambers. All four dynamic pressure measuring openings are spaced equally from the common axis of symmetry, or (d) two or more dynamic pressures may be measured by a probe which contains two or more measuring chambers with retangular or slot-shaped openings which are essentially arranged around an arc or around a periphery of a circle, in which, under the influence of the flow, dynamic pressures may build, whereby in a rear direction of each measuring chamber measuring devices are provided for determining the pressures in the measuring chamber and/or for determining the differential pressures between the two measuring chambers or where pressure measuring ducts end, which are split or after being combined with other pressure measuring ducts are led out of the probe by other measuring chambers.

In one embodiment of the inventive method at least two measuring chambers are provided in which, under the influence of the flow, a dynamic pressure can be built up. The effective opening of a chamber is decisive for the dynamic pressure changes in dependency of the freestream angle of the flow, and the measuring chambers are arranged such that the free-stream angle is different for each of the measuring chambers, so that neither the difference of the dynamic pressures in the two chambers is equal to 0 for all free-stream angles nor the quotient of the two dynamic pressures is equal to 1 for all free-stream angles. Therefore, the difference as well as the quotient are each a steady function of the free-stream angle at least within a certain free-stream angle range.

In the case that from the two dynamic pressures the difference or the quotient is calculated or the pressure difference is measured directly, respectively, the freestream angle can be obtained and therefore the direction of the flow can be determined.

The intensity or the force of the flow in each case can be determined at least in a manner known per se by using one or more of the measured dynamic pressures. For this purpose, the measured values of dynamic pressures are integrated as absolute or vectorial values under consideration of the position of the measuring points, or the measured values are processed mathematically in another way.

Under the most general conditions of the arrangement and construction of the measuring chambers, at least by calibration curves, an unequivocal relation between the pressure difference and/or the quotient of the pressures and the free-stream angle can be obtained. It is, however, useful to select such simple geometric relations for the construction (i.e. especially for the effective dynamic pressure measuring opening) and the arrangement of the measuring chambers so that the relation between the pressure difference and the free-stream angle (or the pressure quotient and the free-stream angle) results in a simple mathematic curve, e.g. a linear curve, a trigonometric function, cylinder section curve, conic section curve or similar function. In this way, it can also be obtained that certain ranges of angles can be detected more sensitively than other ones, and in other situations, less sensitively, namely in the case that, for example, the pressure difference between two measuring chambers will change faster in dependency of the free-stream angle in a certain range of angles as in another one.

A probe which will work on this principle, contains at least two measuring chambers having rectangular-shaped or slot-shaped openings, in each of which chambers under the influence of the flow dynamic pressures can be built up, the dynamic pressure measuring openings of which are arranged under a fixed angle in relation to each other, and the central normals to said openings are positioned in a plane, namely such that at least in a partial range of the free-stream angle dynamic pressures are built up simultaneously in said two chambers, and there are provided measuring devices for determining the pressures in the measuring chambers and/or the differential pressures between the two measuring chambers in a rear section of each measuring chamber.

Preferably, the measuring chamber openings are positioned under an angle of more than about 40 degrees and more preferably under an angle of more than 180 degrees, so that accordingly the range of angles of the probe being open against the flow is greater than 180 degrees.

If it should be necessary to locate the probe at a position in which the flow to be measured can easily be disturbed, e.g. by projecting parts of an airplane or helicopter, it can be more appropriate to use probe opening angles which are smaller than 180 degrees. In this case, the probe itself is an aperture for an area of laminar flow. It therefore, depends from the flow characteristics, with which the flow flows around the probe, whether probe opening angles lower than 180 degrees have to be used. Otherwise, the case could also be that it is even the purpose of the probe to detect and to measure directly a critical flow area.

If sub-critical flows are to be measured, it is preferred to use a probe opening angle of more than 180 degrees. In any case, however, the measuring chamber openings are arranged to each other such that in the measuring chambers dynamic pressures can be built up and the measuring chambers can fulfill their functions to serve as scoops.

Preferably, the measuring chambers abut each other at one of their side walls at the edges of the measuring chamber openings so that the measuring chambers form two part-chambers of a probe measuring chamber.

In a particularly preferred embodiment of the invention, the probe is characterized in that it contains at least one measuring chamber, which is delimited by two side walls of the same length abutting each other under an angle, preferably under a right angle, and an upper chamber wall and a lower chamber wall, which in each case intersect the side walls along a line, in such a manner that a scoop is produced, and a dividing wall which reaches from the upper chamber wall to the lower chamber wall and which extends through the line of intersection or the point of intersection of the two side walls and subdivides the measuring chamber into two sector-shaped part-chambers, and comprises measuring devices for determining the pressures in the two part-chambers and/or the differential pressure between the two part-chambers in the rear section of the measuring chamber.

The dividing wall preferably encloses an angle of 45 degrees with each side wall.

In a preferred embodiment of the invention, the dividing wall has the same length as the side walls and the front edge of the upper and of the lower chamber wall is in each case an arc of a circle or coincides with the straight connecting lines of the end points of the dividing wall and of the side walls.

Flow tests in a wind tunnel on a measuring chamber configured in accordance with the invention have shown that the difference of pressures p1 and p2 building up in the two part-chambers in the measuring chamber placed as a scoop into a flow is a good approximation of a linear function of the free-stream angle $\beta$ between the direction of the flow and the dividing wall. Measurements at an opening measuring chamber having parallel plane upper and lower chamber walls have shown that the linear area extends over a free-stream angle of approximately ±53 degrees, that is to say a total of 105 degrees, at a low flow velocity. Accordingly, it is possible to calculate in a simple manner a value for the free-stream angle and to specify the direction of the flow relative to the measuring chamber which is stationary, from the measured pressure difference between the two part-chambers.

The measurements have also shown that slight deviations from the linear relationship between the pressure difference and the free-stream angle can occur. The characteristics variation of this function depends on the following parameters:

1. Shape of the front edges of the upper and of the lower chamber wall.

It has been found, in particular, that an arc-shaped front edge influences linearity more than a front edge which coincides with the two straight connecting lines between the dividing wall and side walls. In the first case, deviations from linearity within the angle measuring range of the measuring chamber over 90 degrees of up to about 4% were measured whereas the deviations from linearity in the latter case within the same measuring range were within the measuring accuracy and thus lower than 1%.

2. Angle between the dividing wall and the side walls.

If the dividing wall halves the measuring chamber, that is to say includes an angle of 45 degrees with the side walls, a linear function results between the freestream angle and the pressure difference over the total measuring range of the measuring chamber. If the dividing wall in each case forms different angles with the side walls, the measured curve specifying the dependence of the pressure difference on the freestream angle is composed of two straight part-sections, where the knee corresponds to a free-stream angle of $\beta=0$.

3. Length of the dividing wall.

If the dividing wall does not reach up to the front edge of the upper and lower chamber walls, incalculable boundary effects can occur.

The result of these parameters is that the shape given to the front section of the measuring chamber can determine the measuring characteristic. Any deviations from a linear characteristic which may be required over the total measuring range, can be used for increasing the sensitivity in certain selected angular areas.

The difference of the surface areas which corresponds to the effective part-chamber openings encountered by the flow determines the pressure difference occurring between the two part-chambers when the measuring chamber is inserted as a scoop into a flow of a fluid medium. In other words, the pressure in a part-chamber is proportional to the area of the opening of the respective part-chamber at a right angle to the direction of flow. The result is that only the effective area of the opening encountered by the flow needs to be taken into consideration for the linearity of the characteristic curve. The shape of the chamber in the rear section has no further influence on the linearity of the relationship between the free-stream angle and the pressure difference. The rear section of the measuring chamber or of the part-chambers can therefore largely have any design corresponding to other requirements for the measuring probe.

Since the measuring chamber according to the invention is preferably used in the open, it is advantageous to provide precautions against condensation water, spray water, dust particles and insects which may penetrate.

In an advantageous embodiment of the invention, therefore, the line of intersection of the lower chamber wall with one side wall is a line which rises from bottom to top. If water enters the chamber, it runs out again towards the bottom on the inclined surface.

In another advantageous embodiment of the invention the upper chamber wall is provided with a drip bead or a drip projection which extends from one side wall to the other. In addition, the upper chamber wall is preferably also constructed to be inclined. If condensation water then accumulates in the chamber, it also runs along the upper chamber wall downwards and drips downwards from the drip projection or drip bead, impinges on the lower inclined chamber wall and flows out of the measuring chamber.

In another advantageous embodiment, the rear, acute-angled sections of the part-chambers are connected to blind openings which extend upwards and are protected against airborne dust. In these blind openings, the measuring devices are arranged so that they are protected from dust.

It is also advantageous to provide net- or grid-like insect protection in the front part of the part-chambers if it is possible that the measuring probe could be disturbed by penetrating insects. This net- or grid-like insect protection, however, must be attached far enough away from the front edge of the measuring chamber so that its existence does not influence the effective size of the opening.

Since an essential field of application of the measuring probe according to the invention is meteorology, it will not be possible to prevent the probe from also tending to ice up at low temperatures. For this reason, it will be appropriate for certain fields of application, to provide the measuring probe with an electric heating device for de-icing. The heating device itself can be constructed in conventional manner as long as care is taken that it does not disturb the flow around the measuring probe and does not influence the pressure measurement possibly carried out by electronic means.

In addition, it is undesirable in the case of measuring probes installed in the open for birds to come to rest on them and jar them or cause them to become maladjusted by their weight. This problem arises particularly in the case where the measuring probe according to the invention is used on ships for determining the wind direction. In another advantageous embodiment of the invention, therefore the upper part of the measuring probe is provided with a point projecting upwards.

In another embodiment of the invention, the part-chambers are closed in their front section with a thin elastic membrane which transfers the pressure into the interior of the chamber. The membrane must be thin enough and so elastic that the pressure is correctly transferred to the medium located in the interior of the chamber. In this arrangement, the interior of the part-chamber can be filled with an incompressible pressure measuring medium such as oil. This embodiment of the invention makes it possible for the probe to be used for measuring flows of corroding, aggressive, moist and other harmful media without the actual pressure measuring devices in the interior of the part-chambers being attached. Thus, with suitable choice of the membrane material, flows of aggressive chemical substances can also be measured with a probe of this type.

It must be noted that tests have shown that the size of the measuring chamber has no influence on the linearity relationship between the free-stream angle and the pressure difference in the part-chambers. For this reason, the probe can be of very small construction. The size of the probe, that is to say of the measuring chambers, however, has an influence on the sensitivity of the probe if it is not only the flow direction but also the pressure itself which is to be determined. For more accurate measurements, therefore, a probe having larger dimensions is required so that the pressure can be measured more exactly.

In another particularly preferred embodiment of the probe according to the invention, four identical measuring chambers are provided which, abutting each other with their points, side-area to side-area, are arranged in such a manner that their front areas form a peripheral band, the projection of which corresponds to the contour of the front edge of the measuring chamber, that is to say preferably is a circle or an octagon. It is also possible to arrange four identical measuring chambers in this way in such a manner that the projection of their front edges is a square. As has already been mentioned above, the choice of contour of the front edge of the measuring chambers depends on the desired characteristic of the relationship between the free-stream angle and the pressure difference in the part-chambers.

In this embodiment having four measuring chambers, flow directions are detected over directions of 360 degrees. Each measuring chamber has two part-chambers that cover an angular range of 90 degrees. The pressure measuring devices arranged in the center section of the probe are suitably of such a type that they emit the measured value as an electric signal. The measured values of the individual part-chambers can be interrogated and evaluated by means known in themselves, such as microprocessors. In this arrangement, the direction of the flow is supplied by the difference between the pressure values of the two part-chambers of each measuring chamber while the force of the flow is determined by integration or simple addition of the measured pressure values.

All known pressure measuring devices can be used as measuring devices for determining the pressures in the two part-chambers and/or the differential pressure between the two part-chambers. If their dimensions are small enough, they are arranged directly in the rear section of the part chambers. For this reason, for example, pressure-dependent electronic components (such as semi-conductors, piezo-crystals, Hall probes) or temperature-sensitive electronic components (such as NTC or PTC resistors, semi-conductors and so forth), which are used or indirect pressure measurement, as will be explained in greater detail in the text to follow, can be mounted in the part chambers themselves and their measurement lines are passed outwards through the interior of the probe and, for example, its holding shaft. However, if the pressure measuring devices are too large or must be protected against harmful temperature fluctuations, jarring or other interfering influences, the rear section of the part chambers only contains the measuring openings for the pressure measuring devices and rigid or flexible pressure lines, which, for example, are also passed through the holding shaft of the probe, link these measuring openings with the actual pressure measuring chambers of the measuring devices which are located separately and outside of the probe.

According to an advantageous embodiment of the invention, the measuring devices comprise two open tubes, the measuring openings of which are located in the rear section of each part chamber and the other ends of which are each connected to one leg of a U-tube manometer. Since it is usually desirable to obtain the pressure or the pressure difference as an electric signal, the U-tube manometer is filled with mercury in a preferred embodiment and the mercury column height can be electrically measured via the detuning of an induction coil or two induction coils, in which arrangement the leg or legs of the U-tube is or are located inside the coil or coils. The detuning of the induction coil can be measured in a manner known in itself by means of a bridge circuit.

In another advantageous embodiment, the measuring devices comprise two open tubes, measuring opening of each of the tubes being located in the rear section of each one part chamber and the other end of which is connected to one chamber of a barometric pressure-measuring cell. The pressure difference, which can thus be directly measured, between two part chambers of a measuring chamber can be read off at the barometer or picked up in a manner known in itself as an electric signal and further processed.

In accordance with another embodiment of the probe according to the invention, the measuring devices for measuring pressure are two piezo-crystal pressure probes which are arranged in the rear section of each one part chamber. These pressure probes directly supply an electric signal from which the pressure difference can be easily electrically determined. In addition, the piezo-electric signal can be processed to form a measured value of the total force of the flow by summation or integration. In this arrangement, the eight pressure measurement values from the individual part chambers are analyzed according to direction and integrated in a four-chamber probe, as has already been described above.

In another advantageous embodiment of the probe according to the invention, the part chambers are closed at the front with piezo-sensitive strips or strain gauges for direct pressure measurement, the pressure sensitive area of which strips or gauges is in each case equal to the total effective area of the opening of the part chamber. Non-calculable boundary effects must be excluded by suitable shaping of the front section of the measuring chamber in this arrangement or the characteristic with respect to the dependence of the pressure difference on the freestream angle must be established via a calibration curve.

In a quite particularly preferred embodiment of the probe according to the invention, the rear section of the dividing wall has a through opening, which is small in comparison with the dimensions of the measuring chamber and through which a pressure compensating flow forms under the influence of a possible existing pressure difference between the two part chambers, and measuring devices are provided by means of which the pressure compensating flow can be measured. The devices for measuring the pressure compensating flow preferably comprise temperature-dependent electronic components such as, for example, temperature-dependent resistors, semi-conductor sensors or barrier layer elements, the temperature change of which is electronically detected and converted into pressure difference values. The arrangement of a combination of two resistors having negative temperature coefficients in the through opening is particularly advantageous, this arrangement being such that the two resistors are arranged to be aligned in the direction of passage through the through opening through the dividing wall so that the resistor on the side having the higher pressure is cooled to a greater extent than the other resistor. This resistor combination is a part of a bridge circuit in which the energy required for temperature compensation of the resistor which is cooled more is measured which is a measure of the pressure difference between the part chambers. In this arrangement, the energy is preferably supplied in pulsed form so that digital measured values can be easily derived. In this case, it is not necessary to convert the energy value via an analog/digital converter. The direction of the pressure compensating flow, that is to say the analysis of which of the two part chambers has the higher pressure, can also be electronically determined by finding out which of the two resistors is cooled more by the pressure compensating flow.

In a probe having four measuring chambers, the four measuring chambers are sequentially interrogated, for example by microprocessors, for determining the direction in which the fluid to be measured is flowing. The force of the flow can also be determined by suitable calibration of the temperature dependent resistors.

In another embodiment of the probe according to the invention, used for measuring the force of the flow, the eight part chambers of a four-chamber probe have in each case in their rear section through openings, which are small in comparison with the dimensions of the part chamber and which are all radially passed into a centrally positioned space, which is connected to the static pressure, inside the probe and point towards a temperature dependent electronic component, such as for example, a temperature dependent resistor, semi-conductor sensor or barrier-layer element, in which arrangement this electronic component is cooled by the pressure compensating flow forming in the eight through openings, and a circuit is provided which supplies and measures the energy required for temperature compensation of the electronic components which energy, in turn, is a measure of the force of the flow. In this arrangement, all flow components directed towards the probe within a range of 360 degrees are detected and summed up.

Thus, a combination of the two embodiments of the probe according to the invention described last supplies information on a flow with respect to direction and force and signals containing the information can be very easily computationally processed, for example, by means of microprocessors.

In a development of the probe according to the invention comprising four measuring chambers, a further four measuring chambers are provided, two of which are arranged abutting each other with their acute angles and side area next to side area on one side and at right angles to the first four measuring chambers and the other two are in identical manner arranged on the other side of the first four measuring chambers so that the four further measuring chambers are essentially located in a plane extending at right angles to the plane of the first four measuring chambers. Such an arrangement makes it possible to measure flows in two planes perpendicular to each other.

In a development of this embodiment of the probe according to the invention, four further measuring chambers are provided which are arranged in a third plane which extends at right angles to the two other planes, in which arrangement the acute angles of these four further measuring chambers are essentially aligned in the direction of the point of intersection of the three planes. Such an arrangement makes it possible to determine the direction and force of any flow in space.

In another preferred method of the invention, four measuring chambers are provided two of which are opposite each other about an axis of symmetry and the other two of which also are opposite each other about the axis of symmetry. The pairs of measuring chambers are arranged essentially perpendicular to each other, whereby all four dynamic pressure measuring openings are spaced equally from the common axis of symmetry.

The probe thereby exhibits two perpendicularly intersecting pairs of measuring chambers by which the flow is determined from directions perpendicular to each other. Although, this perpendicular arrangement is the preferred method for determining the flow, it is possible to achieve a different measuring characteristic, if that is desired, by placing the two pairs of measuring chambers at a different angle, if different measuring characteristics are desired.

In a further preferred embodiment, each measuring chamber is subdivided into several subchambers, of which each has an externally pointing dynamic pressure measuring opening, and in each subchamber of which is a measuring device for determining the subchamber pressure and/or the pressure differential of the subchamber facing it about the axis of symmetry. It is especially preferred that the probe contain many sector-shaped subchambers—at least in the outer portion—which bordering on one another, are arranged so that the endpoints of the side areas form a circle, and at any given time, two or more subchambers form a measuring chamber. The pressure measuring ducts of these subchambers are brought together into a joint pressure measuring duct, which is that of the joint measuring chamber.

It is hereby possible to adjoin individual subchambers with two neighboring measuring chambers, whereby the measuring chambers, can partially overlap.

Note, that the number of subchambers affects the measuring accuracy. The narrower the subchamber and the greater the number of subchambers forming a measuring chamber, the more accurate the measured result will be.

Good measuring results are achieved by use of the preferred embodiment of the probe which contains eight subchambers combined into four measuring chambers with three subchambers each. It is advantageous to form this probe into a circular, cylindrical disc, along the periphery of which the measuring openings of the subchambers or measuring chambers are evenly distributed.

Note, however, that flow friendlier variations of the probe are also possible. The upper part or the lower part of the probe, for example, may be extended into a point. As far as the measuring results go, only the effective dynamic pressure measuring openings of the measuring chambers or subchambers affect the measurements.

The process of the present invention for measuring the direction and/or the force of a gaseous or fluid flow, which measures the dynamic pressure of the current in at least one measuring chamber system—which may consist of several subchambers—across from which, about the axis of symmetry, is located a second chamber system, with an equally effective dynamic pressure opening, in which the appearing pressure is also measured as the reference pressure (whereby this perhaps serves as a static reference pressure), and the ascertained or directly measured pressure difference between the two chamber systems is obtained as a first reference figure and in a third chamber system which rotates preferably 90 degrees towards the first, as well as toward the second chamber system and has an equally effective dynamic pressure opening across from which about the axis of symmetry is located a fourth chamber system with an equally effective dynamic pressure opening, the dynamic pressure is measured and the difference between it and the measured reference pressure of the fourth chamber system is determined or directly measured, delivering a second reference figure and determining the direction of the current from the comparison of the two reference figures and/or determining the force of the current from the sum of the square of the two reference figures.

When all four chamber systems—or at least their outer portions—are constructed in a circular sector-shaped form and arranged so that their dynamic pressure openings lie in a circular plane, the first reference figure signal, as function of the impact angle, is a good approximation of a sine curve and the second reference figure signal, as function of the impact angle is a good approximation of the cosine curve. The two reference figure signals may, after known standardization, be processed electronically, in an analog computer, to analyze the sine and cosine according to size and sign, in order to determine correctly the impact angle. Preferably, the analog computer will form the arc tangent value of the quotient, from the sine and cosine, which is a direct measure of the impact angle.

The two reference figure signals can, furthermore, be electronically squared and summed, respectively, whereby a measurement of the force of the flow is obtained. This value is independent of the direction of the flow.

Another preferred embodiment of the probe of the present invention includes four measuring chambers, which are constructed in the shape of circular sectors with acute angles of 45 degrees and which are arranged bordering on each other so that a circular sector-shaped disc is formed and four more similar measuring chambers are placed, equally spaced, perpendicular to the first four measuring chambers, whereby the intersecting line runs through the axis of symmetry of both measuring chamber arrangements. Pressure measuring ducts from the eight measuring chambers are led out towards the rear, in the direction of the acute sections of the measuring chambers and are located in a tube which simultaneously serves as a probe support anchor.

The procedure for measuring fluid flows relative to direction and force, in accordance with the invention, is characterized by the fact that the pressures are measured in at least two directions of one plane—and that these pressures are built up in measuring chambers with dynamic pressure measuring openings, and that these chambers are set with fixed angles, one to the other, and that these pressures change under the influence of the flow and that from the differences in the pressure measuring values, the direction of the flow or the dynamic pressure components can be determined and/or from the sum of the pressure measuring values the total pressure (dynamic pressure plus static pressure) is determined and/or from the pressure measuring values which are measured in the measuring chambers which are located so that they are directed away from the direction of the flow, that the flow builds up no dynamic pressure, the static pressure is determined and/or through mathematical computation from the pressure measuring values or differences of same, the flow velocity is determined.

BRIEF DESCRIPTION OF THE DRAWING

In the text which follows, the invention is explained in greater detail by means of illustrative embodiments, referring to the attached drawings in which.

DETAILED DESCRIPTION OF THE PREFERRED EMBODIMENTS

Figure 1:
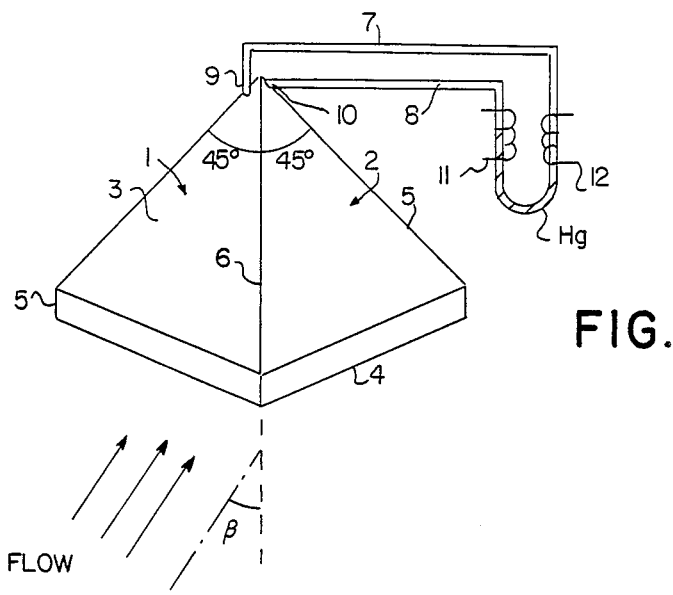
FIG. 1 shows a probe according to the invention, comprising a single measuring chamber.

FIG. 1 shows a probe according to the invention, which contains a single open measuring chamber, the upper chamber wall 3 of which extends parallel to its lower chamber wall 4, and two side walls 5, which are at right angles to the upper and lower chamber walls 4, 5, abut each other at an angle of 90 degrees and are of equal length to delimit the measuring chamber. A dividing wall 6, which is at right angles to the upper and lower chamber walls 4, 5 and which extends through the line of intersection of the two side walls 5, divides the measuring chamber into two sector-shaped part chambers 1, 2 having the same aperture angle of 45 degrees. In the rear section of the part chambers 1, 2, measuring devices are provided for determining the differential pressure which builds up between the two part chambers 1, 2 if a flow impinges on the open measuring chamber at the free-stream angle $\beta$ with respect to the dividing wall 6. In the example shown, the measuring devices are two open tubes 7, 8, the measuring opening 9, 10, respectively, of which are located in the rear section of the part chamber 1 and the part chamber 2, respectively. The open tubes 7 and 8 are connected to the two legs of a U-tube manometer which can be used for directly measuring the pressure difference between the part chambers 1, 2.

Figure 2:
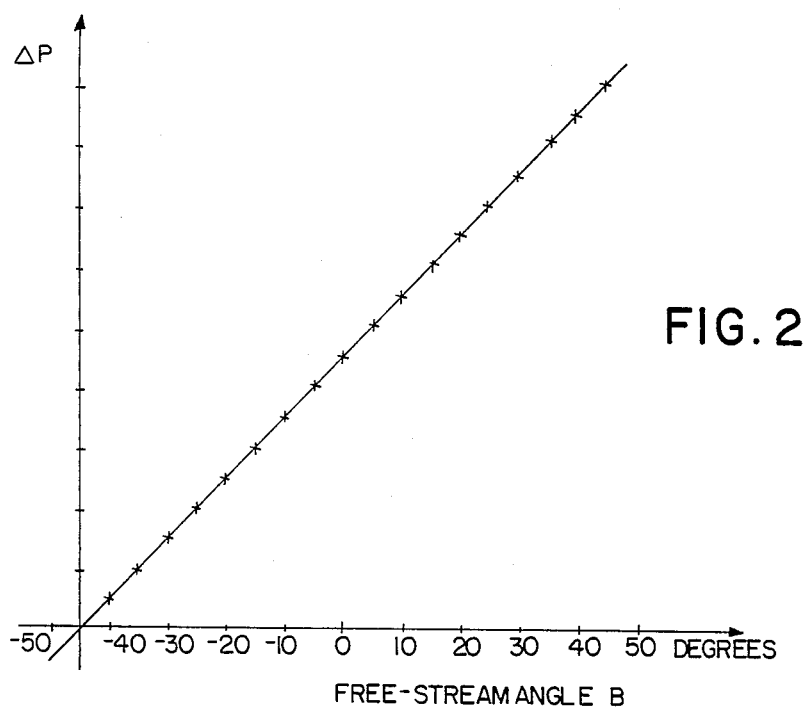
FIG. 2 shows a measurement curve which has been measured on the probe according to FIG. 1 and shows the dependence of the pressure difference in the part chambers on the free-stream angle $\beta$.

FIG. 2 shows a measurement curve which has been measured by means of a U-tube manometer on a measuring chamber as shown in FIG. 1. The pressure difference is a linear function of the free-stream angle $\beta$ with a measuring accuracy within a range of about 105 degrees. Due to this simple relationship between the measurable pressure difference and the free-stream angle $\beta$, the direction of a flow impinging on the measuring chamber can be easily determined from the pressure difference.

The U-tube manometer shown in FIG. 1 is a mercury manometer in which the height of the mercury column is measured by means of induction coils 11, 12, the detuning of which by the change of mercury column can be measured, for example, in bridge circuits.

Figure 3:
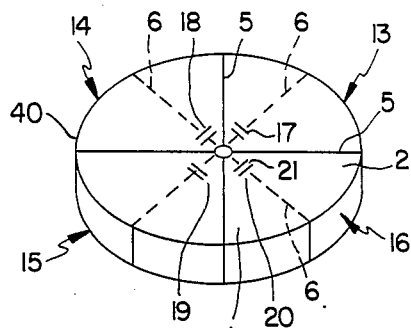
FIG. 3 shows a probe according to the invention comprising four measuring chambers.

FIG. 3 shows a probe according to the invention which contains four measuring chambers 13, 14, 15 and 16 which are arranged together to form a circular disc-shaped probe for detecting flows over a range of 360 degrees. The side walls 5 of two adjacent measuring chambers are in contact with each other and the dividing walls 6 of the four measuring chambers are in each case exactly as long as the side walls 5 and reach to the front edge 40 of the measuring chambers. The configuration of such a probe is simple and the probe can be easily and cheaply produced.

Figure 4:
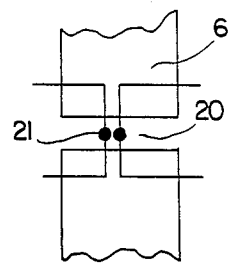
FIG. 4 shows an enlarged representation of the pressure difference measuring device shown in FIG. 3.

In this illustrative embodiment of the probe according to the invention, a through opening 17, 18, 19 and 20 is in each case provided in the rear section of dividing wall 6, in which opening a combination of two subminiature NTC resistors 21 is arranged. FIG. 4 shows an enlarged section of the dividing wall 6 of the measuring chamber 16, in which wall the through opening 20 between the two part chambers 1, 2 is located. The resistor element having a negative temperature characteristic 21 is arranged in the through opening 20 in such a manner that the two resistors are located aligned in the direction of passage through the through opening 20. The through opening 20 is small in comparison with the dimensions of the measuring chamber 16 so that the pressure drop in the measuring chamber having a higher pressure can be neglected due to the occurrence of a pressure compensating flow.

Depending on the direction of the pressure compensating flow, either one or the other resistor is cooled more intensely. These resistors are parts of a bridge circuit and in the bridge circuit the energy is measured which is required for the temperature compensation of the cooled resistor. This energy is a measure of the pressure difference between the two part chambers of the measuring chamber 16.

The pressure difference in the three other chambers 13, 14 and 15 is determined in the same manner.

Figure 5:
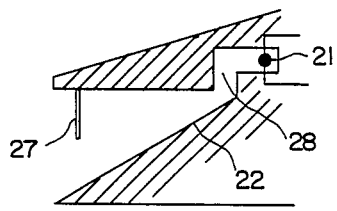
FIG. 5 shows a section through a measuring chamber in a radial direction.

FIG. 5 shows a cross section through a part chamber in the radial direction through a probe protected against condensation water. The lower chamber wall is constructed to be inclined downwards so that water which has entered the measuring chamber flows out downwards over the inclined surface. Correspondingly, the line of intersection 22 of the lower chamber wall with the side wall is a straight line. At the same time, the measuring chamber is protected against entry of dust particles by a drip projection 27. In the rear section of the chamber, a blind opening 28 is provided which extends upwards and contains a pressure measuring device, for example a temperature sensitive electronic component 21, which is thus protected against moisture and dust.

Figure 6:
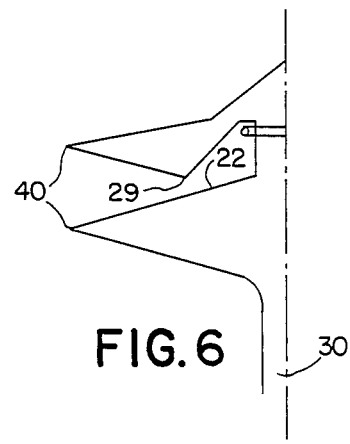
FIG. 6 shows a section through a measuring chamber in a radial direction according to another embodiment of the probe according to the invention.

FIG. 6 shows a cross-section through a measuring chamber of another embodiment of the probe having four measuring chambers. The probe is optimized rotationally symmetrically and with respect to flow. The lower chamber wall drops obliquely downwards and the upper chamber wall is provided with a drip bead 29 from which the condensation water can drip off and flows away via the lower chamber wall. The upper section of the probe is constructed to be pointed. In the interior of the probe, close to its axis, the electrical supply lines for the pressure measuring device are carried out of the pressure measuring chamber through a shaft 30.

Figure 7:
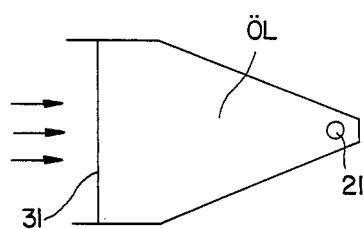
FIG. 7 shows a section through a measuring chamber which is closed with a thin membrane.

FIG. 7 also shows a radial section through a measuring chamber. This measuring chamber is closed with a thin elastic membrane 31 which transfers the pressure, acting from the outside on the measuring chamber, to another medium, for example oil. The pressure is measured by means of the measuring device 21.

Figure 8:
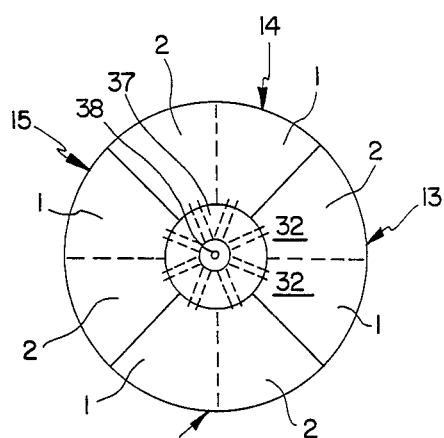
FIG. 8 shows a horizontal section through another probe according to another embodiment of the invention, which can be used for measuring the force of the flow.

FIG. 8 shows a horizontal section through a probe comprising four measuring chambers 13, 14, 15, and 16. In each part chamber 1, 2 of the measuring chambers 13, 14, 15 and 16 a through-opening 32 into a centrally positioned space 37 is provided in the rear section. These through openings 32 are small in comparison with the dimensions of the part chamber. The space 37 is connected to outside space, for example, via the support shaft of the probe. If an external flow acts on the probe, a pressure builds up in the measuring chamber on this side of the probe so that a flow forms through the corresponding through-openings 32. In the interior of the space 37, a temperature-sensitive electronic component 38 is located which is cooled by this pressure compensating flow. An electronic circuit is used for measuring the energy which is needed for carrying out temperature compensation. In this manner, the force of a flow can be measured.

In addition, in the probe shown in FIG. 8, measuring devices, not shown here to simplify the drawing, can be used for measuring the differential pressures in each case between two part chambers 1 and 2 to determine the free-stream angle of the flow.

Figure 9:
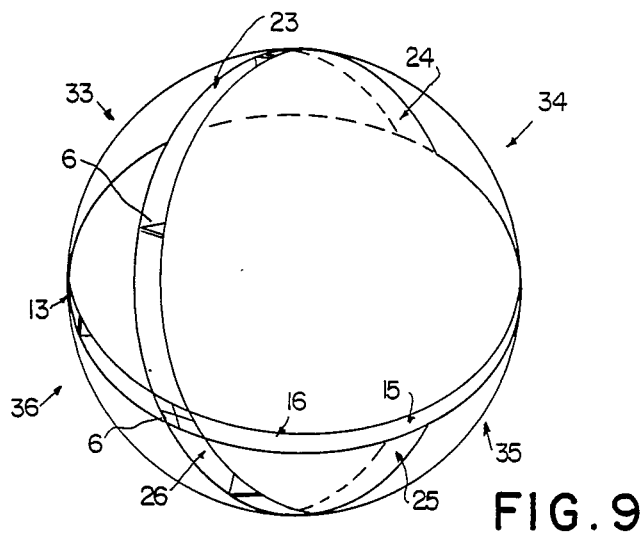
FIG. 9 shows another embodiment of the probe according to the invention for measuring the flow in two planes.

FIG. 9 shows a probe for measuring flows in two planes. On top of a probe comprising four measuring chambers 13, 14, 15 and 16 as shown in FIG. 3, four more measuring chambers 23, 24, 25 and 26 are arranged in a second plane which is at right angles to the plane of the first four measuring chambers.

To cover the complete space, that is to say to be able to measure flows from any directions in space, another four measuring chambers 33, 34, 35 and 36 can be arranged in a third plane which is at right angles to the first two planes. The position of these further four measuring chambers is indicated by arrows in FIG. 9.

Figure 10:
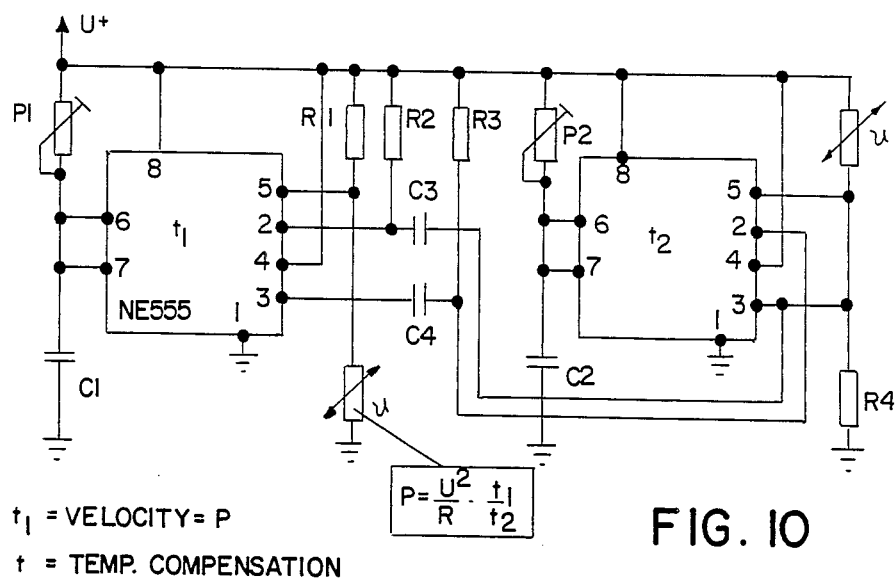
FIG. 10 is a circuit diagram for a pressure measurement circuit with a temperature sensitive resistor.

FIG. 10 shows a circuit by means of which the temperature compensation of a resistor, which is used for pressure measurement and which has a negative temperature coefficient, for example of a sub-miniature NTC resistor which is used for pressure measurement, can be carried out and measured. An NTC bead is heated up to a certain temperature. By cooling the resistor by blowing at it a pressure compensating flow as described above, the NTC bead is cooled. In the present case, the energy needed for reheating it to the same temperature is supplied in pulse form. Low-frequency pulses of about 2 to 400 Hz are preferably used.

The NTC resistor is a component of a timing section $t_1$ which controls the clock rate of a pulse generator. The resistor is supplied with pulse-shaped energy at the same clock rate, longer pulses providing higher energy supply. In other words, the greater the pulse length, the greater the energy supplied. In each case, regulation is to a constant resistance value, that is to say to a constant temperature.

The timer $t_1$ operates in astable mode; it is triggered by a second timer $t_2$ which operates in bistable mode. A control resistor $R_2$ makes it possible tO set a certain basic frequency. Together with the resistor $R_1$, the NTC resistor forms a voltage divider which is connected to one of the outputs of the timer $t_1$ The feedback voltage from the voltage divider supplies the signal with information as to whether the NTC resistor has the correct value. The length of the heating pulses is then controlled by the timer $t_1$ in accordance with the signal.

In this circuit, the length of the individual heating pulses is a measurement variable which can be directly digitally further processed. This greatly simplifies the evaluation of a pressure measurement by means of an NTC resistor, for example via microprocessors.

Figure 11:
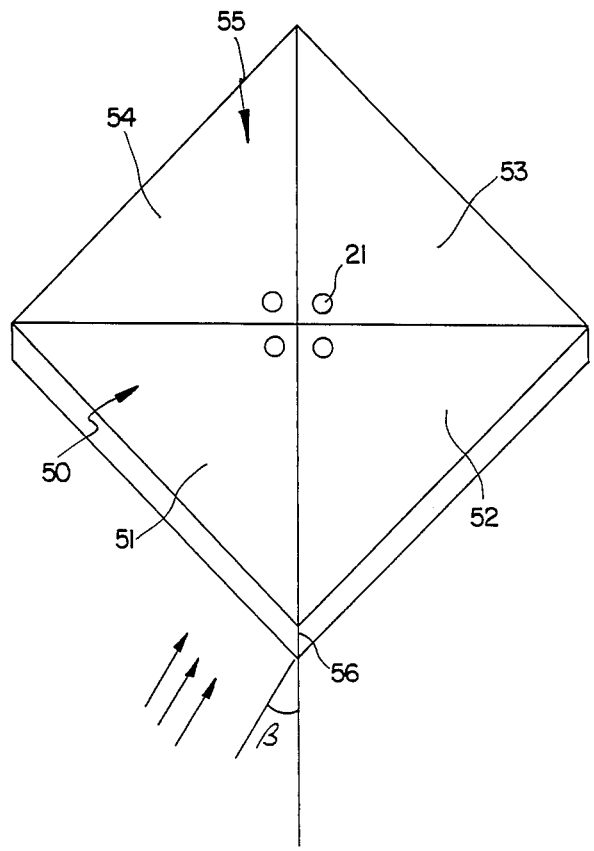
FIG. 11 shows yet another embodiment of the probe of the present invention.

FIG. 11 shows yet another embodiment of a probe according to the invention. In this probe, a measuring chamber 50 consists of two part-chambers 51 and 52 which in each case have a aperture angle of 90 degrees so that the measuring chamber 50 has an aperture angle of 180 degrees. The dividing wall 56 has the same length as the side walls of the measuring chamber 50 and in each case abuts at right angles against these side walls. Opposite to the measuring chamber 50, a second measuring chamber 55 is arranged which consists of two part chambers 53 and 54. The two measuring chambers 50 and 55 thus cover the complete angle of 360 degrees.

In the four part chambers 51, 52, 53 and 54, in each case measuring devices 21 are arranged for determining the pressures in the part chambers or the differential pressure between in each case two part chambers, which correspond to the measuring devices described above in connection with the other embodiments of the probe according to the invention. Correspondingly, only the measuring openings can also be arranged in the rear section of the measuring chamber or the part chambers and rigid or flexible pressure measuring lines can conduct the pressure for measurement to the actual pressure measuring devices which are located outside the probe.

Although the probe shown in FIG. 11 is represented as having a square outline, it can also be constructed to be circular. The shape of the outline edge of the probe has an influence on the characteristic specifying the dependence of the pressure difference between two part chambers on the free-stream angle on $\beta$.

During the measurement over a range of 360 degrees, each of the four walls 56 can be used in this probe as a dividing wall between two part chambers, that is to say 51, 52 or 52, 53 or 53, 54 or 54, 51.

Figure 12:
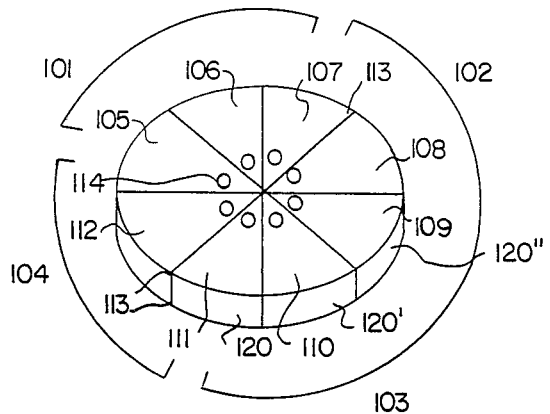
FIG. 12 shows a further measuring chamber arrangement of a probe in accordance with the invention.

Another embodiment of the measuring chamber arrangement of a probe in accordance with the invention, illustrated, in FIG. 12, consists of eight subchambers 105, 106, 107, 108, 109, 110, 111 and 112, of which subchambers 105, 106 and 107 form measuring chamber 101, subchambers 107, 108 and 109 form measuring chamber 102, subchambers 109, 110 and 111 form measuring chamber 103 and subchambers 111, 112 and 105 form measuring chamber 104. Measuring chamber 101, is located opposite, about the axis of symmetry, measuring chamber 103 and forms with it a first measuring chamber pair and perpendicular to which is arranged the measuring chambers 102 and 104. The subchambers are actually designed in the shape of sectors and border with their sides on one another in such a way that the endpoints 113 of the equally long side planes form a circle.

Each subchamber has an external opening, in the illustrated embodiment, which is part of the wall of a cylinder. Note, that the opening could also serve as a direct connection between the endpoints 113 (whereby the probe outline would be a polygon), since for measuring only the effective chamber opening is of importance, dynamic pressure of which determines the flow to be measured.

In a rear portion of each subchamber, measuring devices (114) are provided, in a way that influences the dynamic pressure measurement as little as possible. The measuring devices may, for example, include an opened tube or an opened pressure duct, with their measuring opening in the subchamber, and their other end leading to a measuring device present outside the probe. The pressure in the subchamber, appearing under the influence of the flow, can, however, be measured directly in the subchamber and output from the probe via an electric signal and then processed further electronically.

Figure 13:
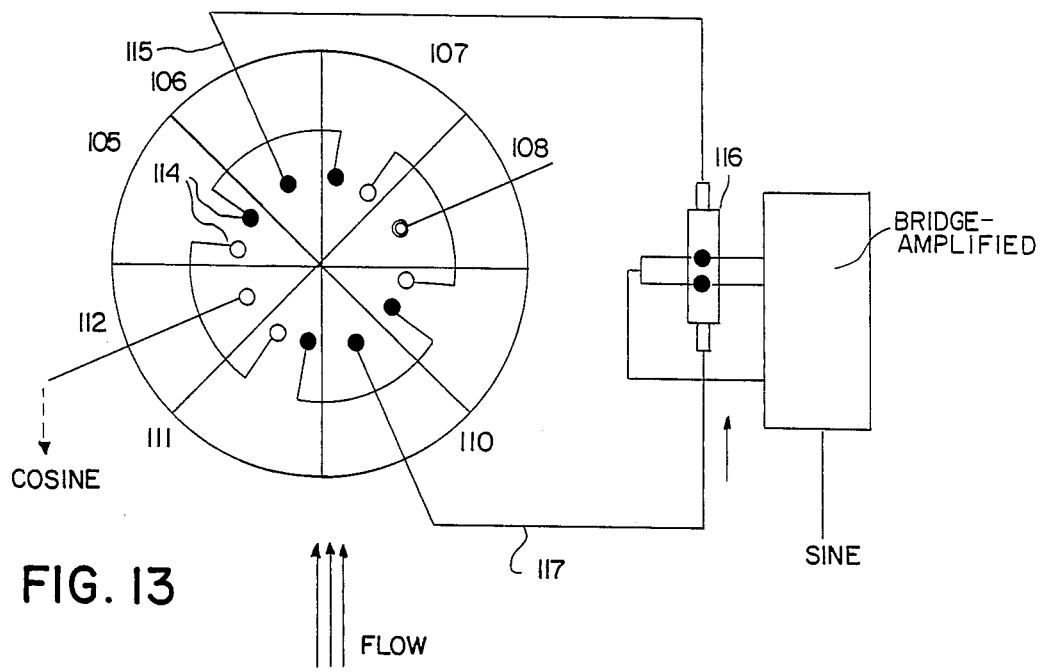
FIG. 13 is a schematic representation of the probe described in FIG. 12, with pressure measuring devices connected to the probe.

As shown in FIG. 13, opened measuring ducts are provided as measuring devices 114, which lead out of the subchambers. The pressure ducts of subchambers 105, 106 and 107 come together in a combined pressure duct 115, which is connected to a pressure duct 117, via a measuring device 116 for determining pressure difference, to which the pressure tubes from subchambers 109, 110 and 111 are joined. In this fashion, measuring chamber 101 is, relative to pressure, connected to measuring chamber 103 via pressure duct 115, measuring device 116 and pressure duct 117.

When now, as shown in FIG. 13, a flow strikes the probe, so that dynamic pressure builds up in the subchambers of measuring chamber 103, this dynamic pressure can be determined by measuring device 116 as pressure differential relative to measuring chamber 101, consisting of subchambers 105, 106 and 107, in which the reference pressure exists.

In the illustrated example, the measuring device 16 consists of a combination of two subminiature-NTC Resistors, that are resistance elements with a negative temperature characteristic, and which are arranged successively aligned in the direction of the flow. When the pressure of the pressure duct 117 is balanced across the resistor combination, the attacked first resistor is cooled off more than the other. The resistors are part of a bridge circuit, in which the NTC-Resistors are inserted to divide the pressure, in order to determine from the resistance changes, the pressure difference between the two measuring chambers 103 and 101.

When the probe, illustrated in FIG. 13, is rotated around its axis of symmetry, against the flow, around the angle x, then the bridge circuit (labeled bridge amplifier in FIG. 13) delivers, depending on the impact angle, a sine shaped curve. When, at any time, the pressure difference between measuring chambers 102 and 104, which are made up of subchambers 106, 107 and 108 or 111, 112 and 104, is measured simultaneously in an analog fashion, then the pressure differential signal, as function of the impact angle x, has a cosine shaped curve.

Figure 14:
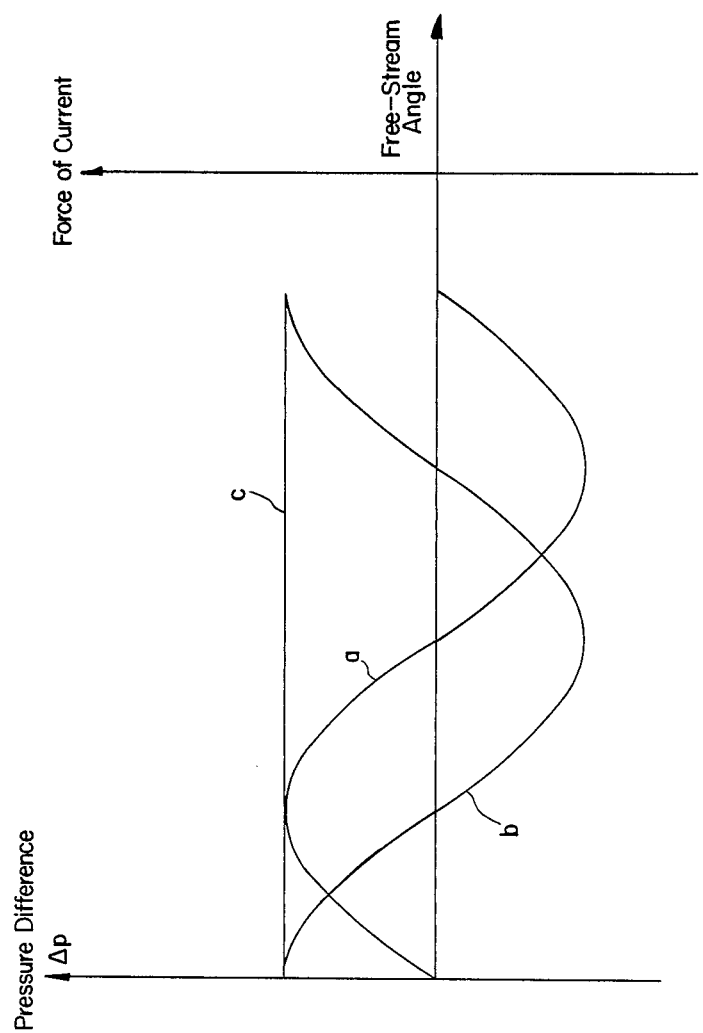
FIG. 14 is a flow chart of the procedure for determining (a) the pressure difference between the measuring chambers shown in FIG. 13, which deliver a sine, (b) the pressure difference between the two other measuring chambers described in FIG. 13, which deliver a cosine, and (c) the squared and summed pressure differential signals relative to the impact angle.

These sine and cosine curves are illustrated in FIG. 14. Moreover, these curves have been determined theoretically through simulation of the expected dynamic pressure, based on geometric observations of the effective dynamic pressure measuring openings, that is the effectively operated openings of the measuring openings 120, 120′, 120 ″, etc.

Figure 15:
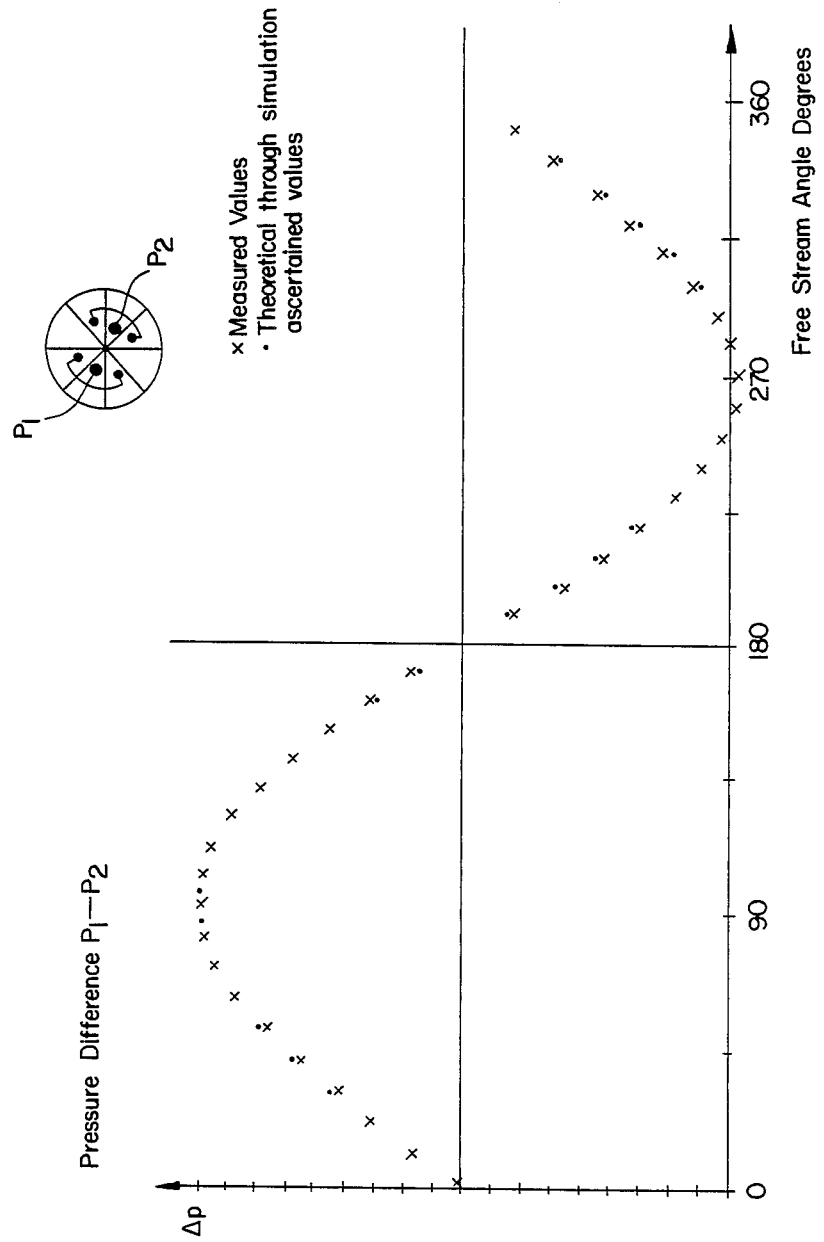
FIG. 15 shows measured values in comparison to theoretical, through simulation obtained, values corresponding to the sine or cosine curve in FIG. 14

FIG. 15 shows a comparison of such theoretical through simulation obtained values, to actual experimentally measured values that were measured on a model. It is already evident from FIG. 15 that a good concurrence between the measured values and the theoretically predicted values is achievable.

The model on which the measured values of FIG. 15 were measured was a probe with eight subchambers, as pictured in FIG. 12. A greater accuracy and better approximation to the sine or cosine curves can be achieved when the number of subchambers is increased.

The sensitivity, on the other hand, depends on the angle of the opening of the measuring chamber. Subdividing the measuring chamber into several subchambers and combining several subchambers, results in an increase of the effective dynamic pressure measuring area leads to an increase in sensitivity, while combining fewer subchambers of a measuring chamber results in a decrease in the effective dynamic pressure measuring area and leads to a decrease in sensitivity.

The choice of total number of subchambers, the choice of how many subchambers to combine into a measuring chamber, the choice of opening angle of a measuring chamber, the fashioning of the dynamic pressure opening, the influence of the periphery effect of the dynamic pressure measuring opening etc. are in practice determined by the expert, according to the requirements.

Figure 16:
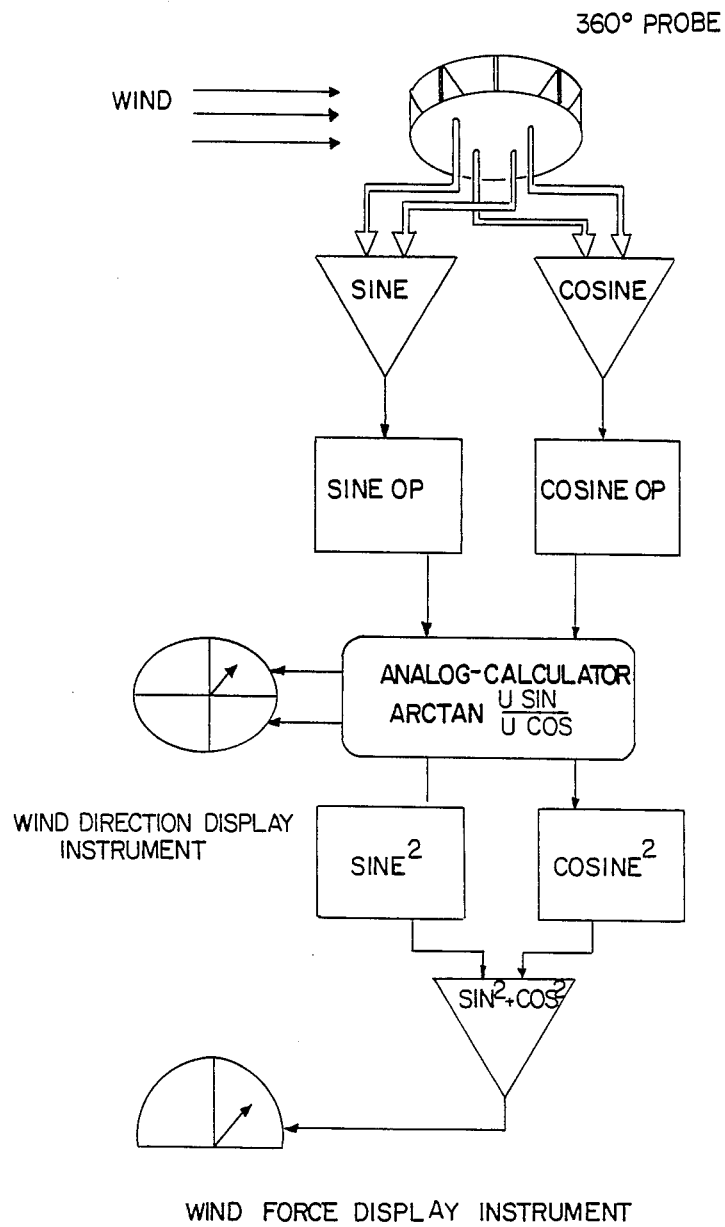
FIG. 16 is a block diagram of a 360 degree probe of the present invention used for wind measurement.

FIG. 16 shows a block diagram of a probe, in accordance with the invention, which measures the a fluid flow about 360 degrees according to direction and force.

In this arrangement of the measuring chamber, the actual sensor is located in the flow. The pressure measuring ducts of the subchambers of a measuring chamber lead out of the sensor as a single pressure duct, as illustrated in FIG. 13 by reference number 115 or 117. The pressure difference between the two measuring chambers opposite each other deliver a sine, while the pressure difference between the other two measuring chambers, opposite each other and arranged perpendicularly to the first pair of measuring chambers deliver a cosine. The sine is input into an operational amplifier labelled "Sine OP", and the cosine into an operational amplifier labelled "Cosine OP". The outputs of these operational amplifiers are connected to the inputs of an analog computer, which produces the actual arc tan-value of the quotient of the sin and cosine and passes it on to a flow direction display instrument, such as a compass. The impact angle x may be read directly from the wind direction display instrument.

The sine and cosine are, furthermore, passed on to squaring circuits "Sine 2"and "Cosine 2", which actually square the signals, and the outputs of these two squaring circuits are summed in an amplifier. The resulting output signal is a measure for the flow force and is independent of direction. The course of this signal, dependent on the impact angle, is illustrated as a third curve in FIG. 14 (curve c).

A flow measuring probe, which analyzes and measures currents about 360 degrees as to direction and force, as illustrated in FIG. 16, has many applications in navigation, aviation, etc.

Figure 17:
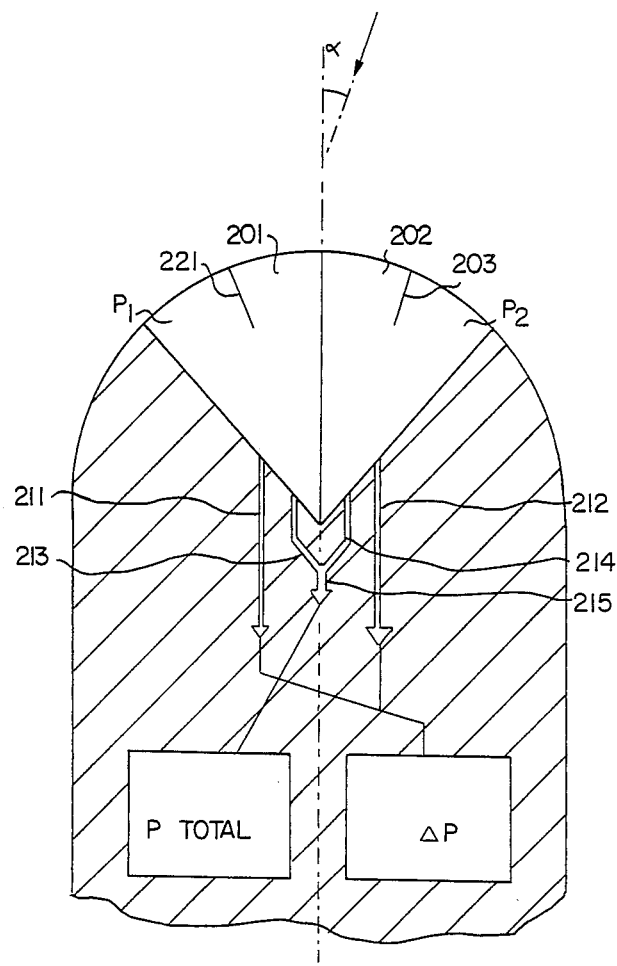
FIG. 17 is a front cross sectional view of another embodiment of the probe in accordance with the present invention.

FIG. 17 shows the front cross section of another embodiment of a probe in accordance with the invention. Two measuring chambers 201 and 202 with rectangular slot openings are circular sector shaped in outline and are next to each other, with a joint sidewall arranged in such a fashion, that their openings form an arc. The cross sectional view illustrated in FIG. 17 corresponds to a cross section of measuring chambers 201 and 202 along the longitudinal direction of the slot-form openings. The thickness of the measuring chambers, that is the expansion perpendicular to the plane of the page, is the same all over the front section of the measuring chambers. The fluid flow, striking the probe from the front, therefore, strikes the rectangular or slitform openings.

Especially because of production reasons, it is recommended that the chosen thickness of the measuring chambers be the same over its entire area, so that the measuring chambers are disclike hollow chambers.

In the rear sections of measuring chambers 201 and 202 measuring devices are provided for determining the pressure in the measuring chamber and/or for determining the differential pressure between measuring chambers 201 and 202. The example, illustrated in FIG. 17, displays schematically only pressure measuring ducts 211, 213 and 212, 214, which end in a rear section corresponding to measuring chamber 201 or 202 and which extend from the measuring chambers to the rear. Across measuring ducts 211 and 212, under the influence of existing flow, the appearing pressures, $p_1$ in measuring chamber 201 and $p_2$ in measuring chamber 202, are measured directly, while pressure measuring ducts 213 and 214 lead together into a connection duct, which measures the resulting pressure, consisting of pressures $p_1$ and $p_2$. This resulting pressure corresponds, when dealing with an angle of impact of ±45 degrees, to an addition of pressures $p_1$ and $p_2$.

From the pressures, $p_1$ and $p_2$, which are seized from the pressure measuring ducts 211 and 212 the difference is determined, which is a steady function of angle of impact x. More clearly, this differential pressure is a measure of the components of the impact angle, which is created due to the projection of the direction of the impact angle onto the plane of the measuring chambers. In reality (e.g. during the flight of aircrafts) these components would correspond to the vertical or horizontal components of the impact angle, which depends on the position of the measuring probe.

The probe, displayed in FIG. 17, may therefore, be used to determine the total pressure and the angle of impact which strikes from the front in a range of ±45 degrees.

In a front section, that is, near the periphery of an arc, dividers 221 and 222 are provided, which extend a little into the interior of the measuring chambers. Such dividers increase the accuracy of the measurement. The more dividers provided inside of a measuring chamber, the greater the accuracy of the measurement is. On the other hand, the provision of too many dividers can lead to a small dirtying of the measuring chamber opening, which then, in turn, leads to a falsified measurement. In everyday usage, the expert will find, by experimenting, the right number of dividers, depending on installment of easibility.

Figure 18:
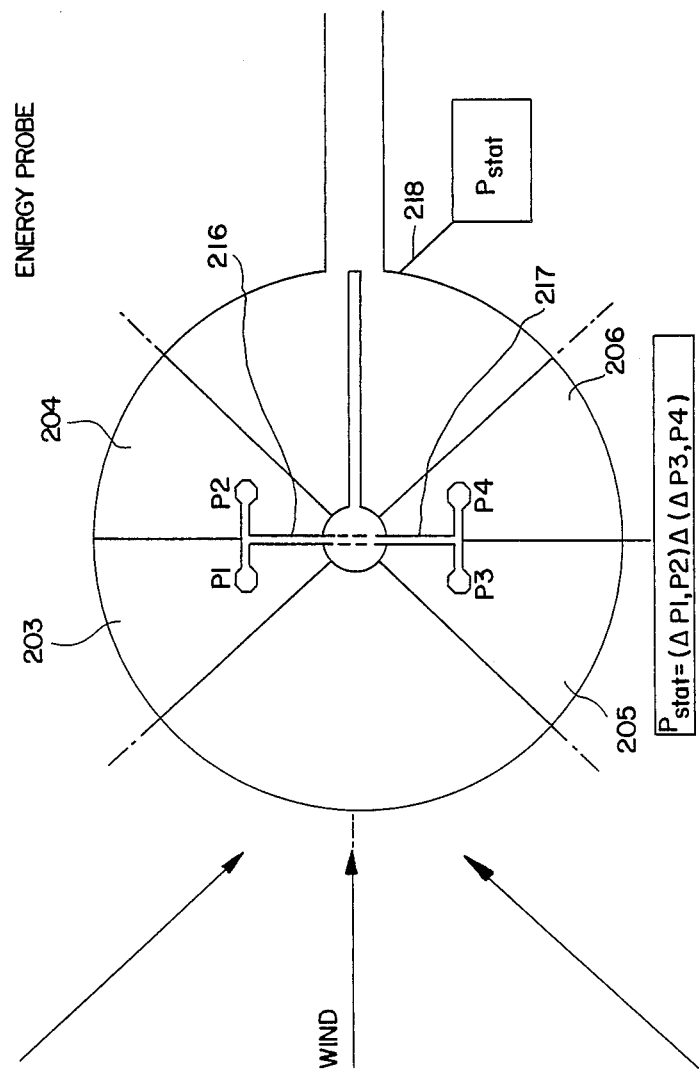
FIG. 18 is a schematic diagram of a cross section of a probe in accordance with another embodiment of the invention.

FIG. 18 shows a schematic cross sectional view of a further form of the invented probe. The measuring range of the angle, in which the probe may be installed, is given by arrows and amounts to ±45 degrees. The fluid flow is labeled in the figure as "WIND".

In the displayed form of execution, the probe is a circular disc of which measuring chambers 203, 204, 205 and 206 take up two sectors. Measuring chambers 203, 204, 205 and 206 are themselves built in the shape of circular sectors and display an acute angle of 45 degrees. Chambers 203 and 204 are located diametrically across from chambers 205 and 206 and, to be exact, symmetrically to the measuring range of the impact angle. In measuring chamber 203 pressure $p_1$ exists, in measuring chamber 204 pressure $p_2$, in measuring chamber 205 pressure $p_3$, and in measuring chamber 206 pressure $p_4$. Through a pressure-like connection of chambers 203 and 204 differential pressure $p_1$, $p_2$ appears in a connection duct 216, which by pressure-like connection of chambers 205 and 206 in a connection duct 217 differential pressure $p_3$, $p_4$ appears. Connection ducts 216 and 217 come together in a pressure chamber, in which the differential pressure appears correspondingly from the two pressure differences $p_1$, $p_2$ and $p_3$, $p_4$. Into this pressure chamber empties a connection duct 218 from which the resulting pressure may be determined.

From the theory of the flows around a cylinder or a circle, it is evident that the pressure seized from connection duct 18 is the prevailing static pressure $P_{stat}$, when the impact angle is $\leq \pm 45$ degrees.

In this form of the invented probe, the static pressure may be measured, which plays an essential role as barometric pressure during flying.

Figure 19:
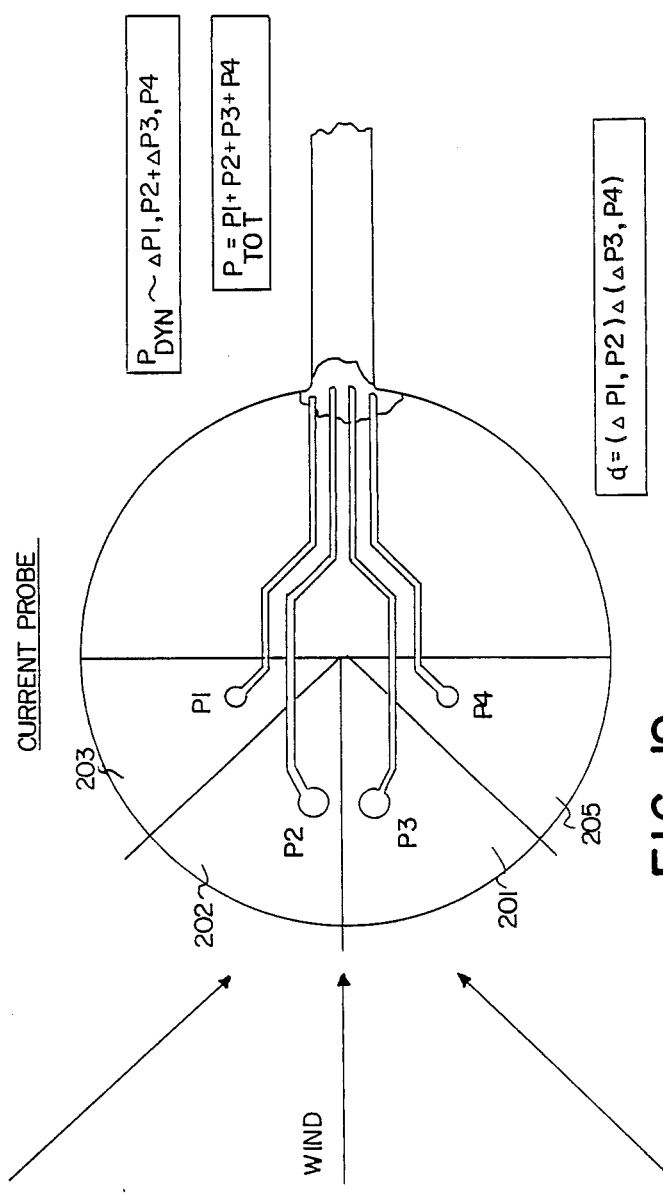
FIG. 19 is a schematic diagram of a cross section of a probe in accordance with still a further embodiment of the invention.

FIG. 19 shows a further embodiment of the invented probe in cross section. Four circular sector shaped measuring chambers 203, 202, 201 and 205 which exhibit acute angles of 45 degrees, are arranged next to each other in such a fashion that the slot shaped openings form a semicircle. The measuring range of the probe encompasses an angle of impact of ±45 degrees relative to the axis of symmetry Consequently, the dynamic pressure area effective for the flow is for every angle inside the measuring range of ±45 degrees (that is, the projection of the area of the chamber openings): diameter of the probe multiplied by the thickness of the disc of the measuring chamber height This effective pressure area is therefore equal for all impact angles within the measuring range.

In order that the effective pressure area of the probe always remains constant within the permissible impact angle of ±45 degrees, one gets through addition of the segment shaped or circular sector shaped measuring chambers of 45 degrees each, measured partial pressures $p_1$, in measuring chamber 203, $p_2$ in measuring chamber 202, $p_3$ in measuring chamber 201 and $p_4$ in measuring chamber 205, a constant dynamic pressure as a function of the actual force of impact of the flow. The total pressure $P_{tot}$ is thus equal to the sum of the four measured pressures in measuring chambers 203, 202, 201 and 205.

$$P_{tot} = p_1 + p_2 + p_3 + p_4.$$

With the probe in accordance with FIG. 19, it is therefore possible to measure the total pressure consisting of the sum of the dynamic pressures and the static pressure, within a large impact angle.

By measuring the differential pressure between measuring chambers 202 and 203, on the one hand, and 201 and 205, on the other, that is, the measuring pairs, which are located, relative to the axis of symmetry, mirror image like across from each other, it is possible to determine the exact angle of impact x, as described in connection with FIG. 17.

With the probe illustrated in FIG. 19, one may, however, using a different procedure, also measure the dynamic pressure directly, that is, in the following manner:

When the current strikes the probe from the front, it creates pressures in measuring chambers 203, 202, 201 and 205, which were appropriately labeled $p_1$, $p_2$, $p_3$ and $p_4$ in the drawing. Each one of these partial pressures consists of a static pressure and a dynamic pressure component. When the angle of impact is greater than zero, that is, the flow does not coincide with the axis of symmetry of the probe, each dynamic pressure component, which is present in $p_1$, $p_2$, $p_3$ and $p_4$ except for the static pressure, is now a different one. Because the measuring range of the probe for this type of measurement amounts to ±22.5 degrees to the axis of symmetry of the probe, as described below, pressure $p_2$ is greater than pressure $p_1$, and pressure $p_3$ is greater than $p_4$. By creating differentials $p_2$ minus $p_1$ or $p_3$ minus $p_4$, one obtains a pressure difference, which corresponds to the pressure difference of the dynamic pressure components in chambers 202 and 203. The static pressure is extracted during subtractions. In the same manner, the difference $p_3$ minus $p_4$ delivers the difference of the dynamic pressure components of measuring chambers 201 and 205.

When now, in the previously described manner, the obtained differences of the dynamic pressure components $p_1$ minus $p_2$ and $p_3$ minus $p_4$ are added, a dynamic pressure component $P_{dyn}$ is obtained, which is proportional to the total pressure, which is produced in chambers 203, 202, 201 and 205.

When the measuring range is now limited to impact angles of ±22.5 degrees to the axis of symmetry of the probe, this, through summation created, total dynamic pressure component, $P_{dyn}$, resulted by summation and is proportional, over the entire measuring range of the probe, to the dynamic pressure, which results from the sum of the dynamic pressure components of the pressures $p_1$, $p_2$, $p_3$ and $p_4$. Limiting the angles of impact to ±22.5 degrees to the axis of symmetry of the probe is therefore necessary, since by larger angles in one of chambers 203 or 205 no dynamic pressure would be built up anymore, so that the corresponding difference $p_2$ minus $p_1$ or $p_3$ minus $p_4$ would only contain a fraction of dynamic pressure of the pressure $p_z$ or $p_3$.

On the other hand, it is evident, that by limitations of 22.5 degree impact angles, the dynamic pressure could be measured with this embodiment, without the static pressure being additionally measured. This permits determination of the velocity of the current (the "course" in the case of aircrafts). Hereby the completely essential advantage develops, that no more altitude errors will develop or will have to be corrected.

Figure 20:
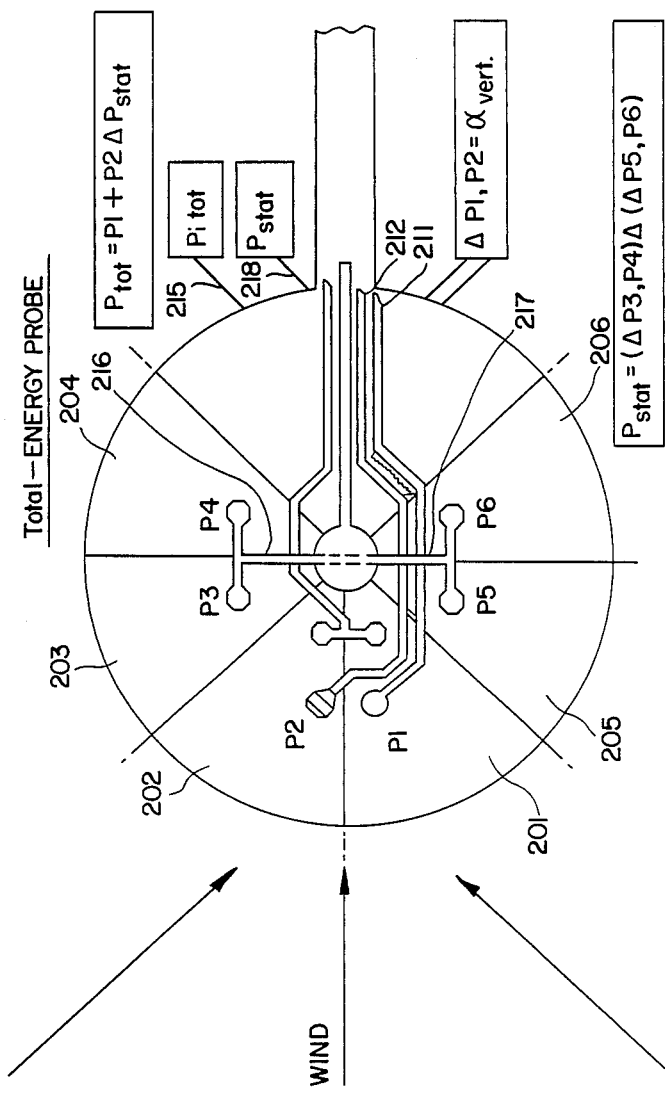
FIG. 20 is a schematic diagram of a cross section of a probe in accordance with still another embodiment of the invention.

FIG. 20 shows a cross sectional view of a further preferred embodiment of the probe in accordance with the invention. With this probe, six measuring chambers 201, 202, 203, 204, 205 and 206 are provided, of which each is circular sector shaped with an acute angle of 45 degrees, and these measuring chambers border with their sidewall onto a neighboring measuring chamber, so that the entire probe encompasses a circular sector section of 270 degrees. In the rear portion of the probe, which is not used as a measuring chamber, pressure ducts lead out of the measuring chambers. These pressure ducts lead into a tube, which simultaneously serves as a support of the probe.

The measuring range of the fluid flow, herein referred to as "WIND", amounts to ±45 degrees to the axis of symmetry of the probe. Under the influence of the current, the pressures $p_1$, $p_2$, $p_3$, $p_4$, $p_5$ or $p_6$ corresponding to chambers 201, 202, 203, 204, 205 or 206 prevail. In a similar manner, as described in connection with FIG. 18, the static pressure, $P_{stat}$, across measuring chamber pairs 203, 204 and 205, 206 may be determined. For this purpose, the differential pressure of measuring chambers 203 and 204 across pressure connection duct 216 is combined with the differential pressure between measuring chambers 205 and 206 across pressure connection duct 217, where the appearing differential pressure across connection duct 218 may be determined as static pressure Measuring chambers 201 and 202 serve, on the one hand, as pressure chamber (Pitot-tube), and are, for this purpose, pressure like connected with each other. Connection duct 215 also leads out of the rear portion of the probe.

Besides that, measuring chambers 201 and 202 serve for determining the impact angle x, more clearly stated, the components of the impact angle in the plane of the measuring chambers. For this purpose, pressure ducts 211 lead directly out of measuring chamber 201 and ducts 212 out of measuring chamber 202, in order to be able to determine the pressure difference, as it is described in connection with FIG. 17.

It is naturally, furthermore, possible to determine the total pressure as the sum of pressures $p_1$, $p_2$, $p_3$ and $p_4$, as described in connection with FIG. 19.

In each case, the possibility presents itself through this embodiment of the probe, to determine, simultaneously, with the same probe, the total pressure, the dynamic pressure, the static pressure, as well as the impact angle x. The measuring range of the probe with an impact angle of ±45 degrees is, in comparison to the technical standard, great.

Note, that by combining the measured pressures, namely dynamic pressure and static pressure, at the same location, the possibility exists for the first time to measure the actual pressure relations at a specified location. With aircraft, for example, the velocity, the environmental pressure and the direction of the flow may now be determined simultaneously.

The described embodiments of FIGS. 17-20 of the probe in accordance with the invention, encompass only sector shaped measuring chambers, which lie in one plane. As already mentioned several times, with probes of this nature, only the relations in one plane, for example, the horizontal or vertical plane, may be determined.

The embodiments of the invented probe especially advantageous on a practical scale, contains therefore, in addition to the disc shaped measuring chamber arrangement of the first plane, a second disc shaped measuring chamber arrangement which is placed perpendicular to the first measuring chamber arrangement, whereby the intersecting line runs through the axis of symmetry of both disc shaped measuring chamber arrangements. In this fashion, it is possible to conduct the same measurings, which as already described, may be conducted in one plane, additionally in a plane perpendicular to the first, so that the entire interior angle of ±45 degrees to the axis of symmetry of the probe, can be determined by the measuring.

Figure 21:
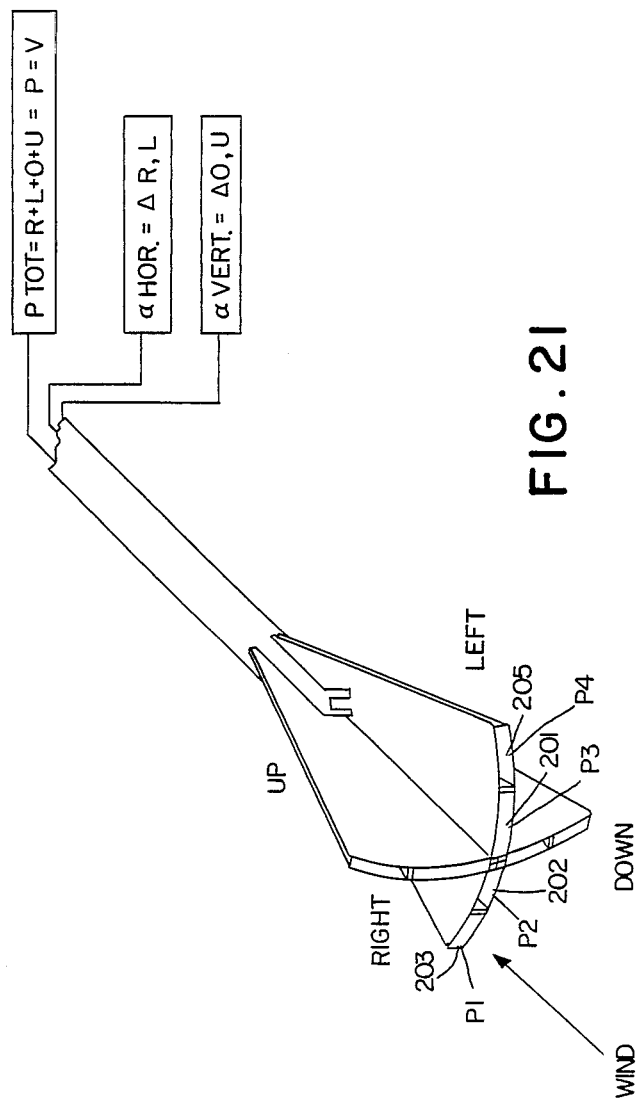
FIG. 21 is a perspective view of the essential components of the probe shown in FIG. 19.

A probe of this nature for the measuring of spatial impact angle ranges is schematically illustrated in FIG. 21. The probe pictured there shows an arrangement of four measuring chambers 201, 202, 203 and 205, as shown in a cross view of FIG. 3, for both the horizontal and vertical direction. The pressures $p_1$, $p_2$, $p_3$ and $p_4$, given in FIG. 21, prevail in measuring chambers 203, 202, 201 or 205, corresponding to the numbers in FIG. 19.

By combining these two measuring chamber arrangements, which are along their axis of symmetry perpendicularly on top of each other, a probe is obtained, which delivers, in a vertical, as well as horizontal plane, within ±45 degrees to the axis of symmetry, a constant pressure as measuring size.

By measuring the differential pressures between the measuring chamber pairs, which are on both sides of and meet by the axis of symmetry, it is possible to also determine the angle of impact of the two planes, consequently, also in the corresponding spatial angle range.

In analog fashion, a space measuring probe can be obtained by combining six measuring chambers, 201, 202, 203, 204, 205 and 206, which are formed in circular sector shaped fashion and bordering on each other, are arranged as shown in FIG. 20, with six further essentially similar measuring chambers equally arranged perpendicularly to each other, whereby the intersecting line runs through the axes of symmetry of both circular sector shaped discs. The structural erection corresponds to that of the probe pictured in FIG. 21, whereby the front portion of the probe is formed by a larger bullet type shape.

Such space measuring probes find many applications in avionic technology. They may, for instance, be used as pressure tubes, like Pitot-tubes, for the measuring of aircraft velocity. Furthermore, it is possible to seize with such probes, the slip of an aircraft, which plays a large role during a side gliding flight. It will even be possible to measure the angle by which the aircraft moves sliplike, which is the reason for completing the pressure difference measuring $p_2$, $p_1$, and besides, simultaneously conducting course measuring, which is possible upon determination of the dynamic pressure Furthermore, it is possible to measure the impact angle exactly. Hereby, the stalling point may be determined when the flow threatens to tear off and a stall warning is given.

By combining measuring pressures $p_1$ through $p_6$ in the two perpendicular planes and by measuring the resulting differential pressures, it, furthermore, becomes possible to determine circular and scrambled flow in a given flow direction.

Fundamentally it should be noted, that the probe may be held into the fluid flow, which is to be measured, or that it also may be attached to aircrafts and thereby will be moved through fluid media. The measuring principle is not changed because of that.

A very essential application of the probe according to the invention lies, however, principally in its use as a measuring probe for flying objects. With it a course measurement may be made without the static pressure or reference measurement having to be measured separately. Up to now it was necessary, for purposes of determining the course (that is, the velocity v), to conduct a barometric compensation for each measurement of the dynamic pressure. Good instruments very often have a compensation supplied by the altitude gauge, but even considering that, an error caused by air currents is still possible and probable.

The angle of impact or the angle of the flying object toward the flow is simply measurable through pressure differences. The measuring of course (v) and angle (x) is possible in two planes across a large measuring angle. While presently, the Prandtl pressure tube, with a measuring angle range of ±15 degrees, is customarily available to aircrafts to measure the dynamic pressure and static pressure, for the measuring of course over dynamic pressure, under consideration of the static pressure, the invented probe offers a measuring angle range of ±45 degrees. Pressure nozzles, anyhow, measure accurately only in angle ranges of ±10 degrees and have a large incidence of errors by larger measuring angles. The invented probe can also be used as a measuring probe for barometric or static pressure, that is, replace a traditional pressure probe for measuring of static pressure with a rounded tube with ringlike slits (hereby either the configuration pictured in FIG. 18 may be used, or the pressure is measured in one or more of the measuring chambers, which are located in the rear portions of the measuring probe, opposite from the impact, which is essentially equal to the static pressure).

In summary, the main application of the invented probe is an angle-and course gauge for aircrafts and also for ships and occasionally land based vehicles.

Figure 22:
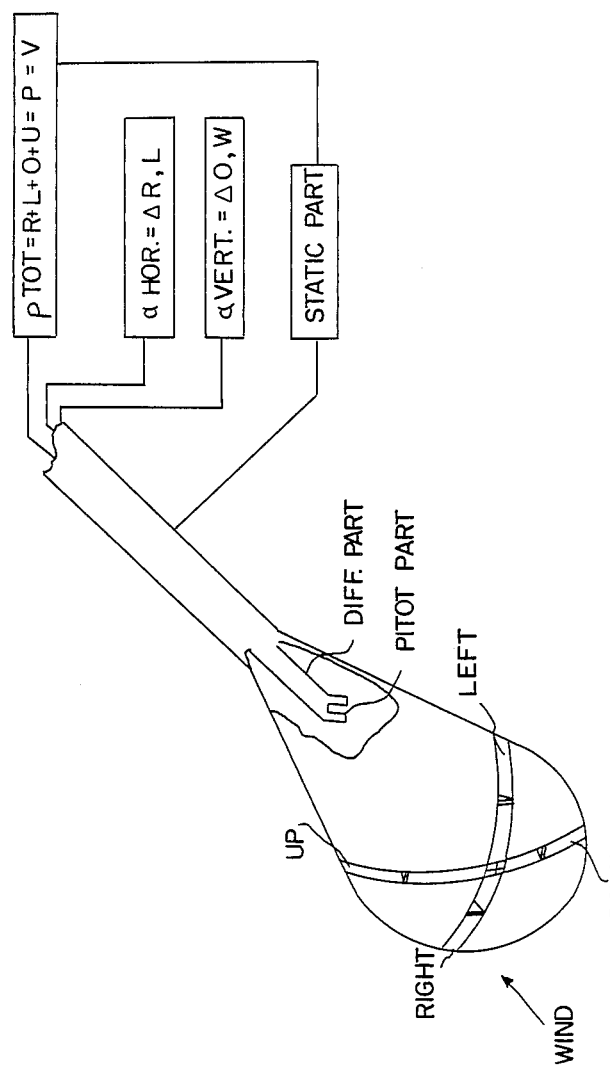
FIG. 22 is a perspective view of the probe shown in FIGS. 19 and 21.

FIG. 22 shows another perspective view of a probe, according to the invention, for spatial measuring, the probe which is housed in a casing with low flow resistance. It exhibits a bullet shape on the front.

When, however, more chambers are to be used for the measuring, corresponding for example to the probe in FIG. 20, or when besides the last two unused chambers, pictured in FIG. 20 for the measuring of static pressure, additionally are to be used, the shape of the probe housing has to be changed accordingly. With a circular disc shaped probe, naturally, the support of the probe has to extend out of the measuring plane. It is clear to the expert, that one must watch for low flow resistance of the probe against the flow to be measured.

Figure 23:
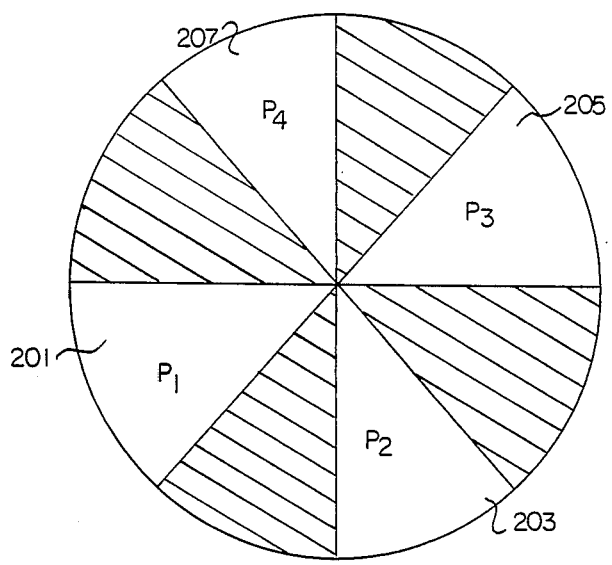
FIG. 23 is a schematic diagram of another embodiment of the probe in accordance with the invention.

FIG. 23 finally shows, schematically yet, the cross section of a circular disc shaped probe with several circular sector shaped measuring chambers 201, 203, 205 and 207, which do not border on each other, but are arranged with gaps in such a fashion that their measuring openings are along the periphery of a circle. Under the influence of a current, while using this probe, pressure $p_1$ forms in measuring chamber 201, pressure $p_2$ in measuring chamber 203, pressure $p_3$ in measuring chamber 205 and pressure $p_4$ in measuring chamber 207. A change of the angle of impact of 360 degrees changes continuously the pressure differences $p_3$ minus $p_1$ and $p_4$ minus $p_2$ and thereby permits, when measuring, an inference to the angle of impact.

Figure 24:
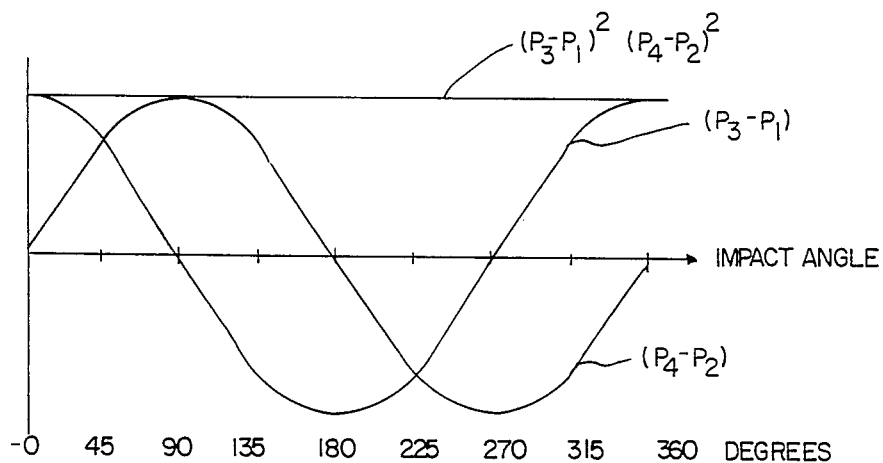
FIG. 24 is a graphical representation of the measured values as a function of the impact angle, which are obtained with the probe in accordance with the embodiment shown in FIG. 23.

FIG. 24 shows curves, derived through computer simulation, of the magnitude $p_3$ minus $p_1$, $p_4$ minus $p_2$, and the sum of the squares of these magnitudes. In the present case, the curves are pure sine-or cosine curves, and consequently the third curve is a straight line. The example in FIGS. 23 and 24 is supposed to show, that the development of the invented probe is in no way limited to the types of executions described in FIGS. 17 through 20, but that the arrangement of the measuring chambers may be changed according to the measuring purpose. This way, the measuring range of the angle of impact, the pressure relations of concern, etc. may be changed, or variations of the probe may be undertaken, when certain impact angle ranges are blocked or disturbed.

Although in all illustrated examples the measuring chambers contain an outline in the shape of a circular sector with an acute angle of 45 degrees, it should be expressly noted, that the functional principle of the probe is not limited to this form. Moreover, measuring chambers may be used, the front of which (that is, in the range of the periphery of an arc) is sector shaped, whereby the sector piece corresponds to another angle of 45 degrees.

Moreover, the rectangular-or slitform openings of the measuring chambers may deviate from the arc form, e.g. may be straight, whereby the endpoints of the measuring chamber openings lie in an arc, so that the circular sector configuration still remains "essentially" intact.

Figure 25:
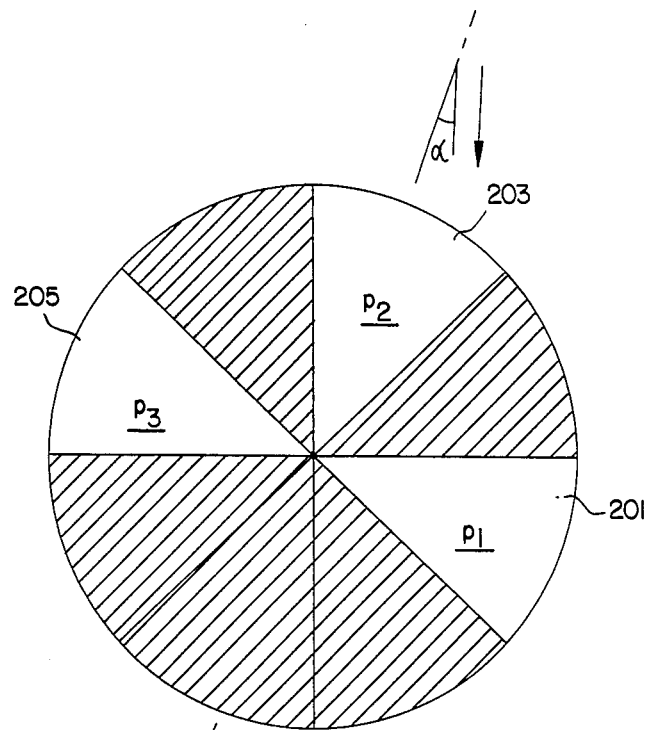
FIG. 25 is a schematic diagram of an alternative measuring chamber arrangement.

FIG. 25 shows schematically a cross section of a circular disc shaped probe with several circular sector shaped measuring chambers 201, 203 and 205, which do not border on each other, but with gaps are arranged in such a way that their measuring openings are arranged along the periphery of a circle. Under the influence of a flow, when using this probe, pressure $p_1$ builds in measuring chamber 201, pressure $p_2$ in measuring chamber 203 and pressure $p_3$ in measuring chamber 205. When the direction of the flow coincides with the axis of symmetry of the probe, pressure $p_2$ in measuring chamber 203 reaches its maximum. The pressure difference $p_3 - p_1$ is equal to zero in this case.

Figure 26:
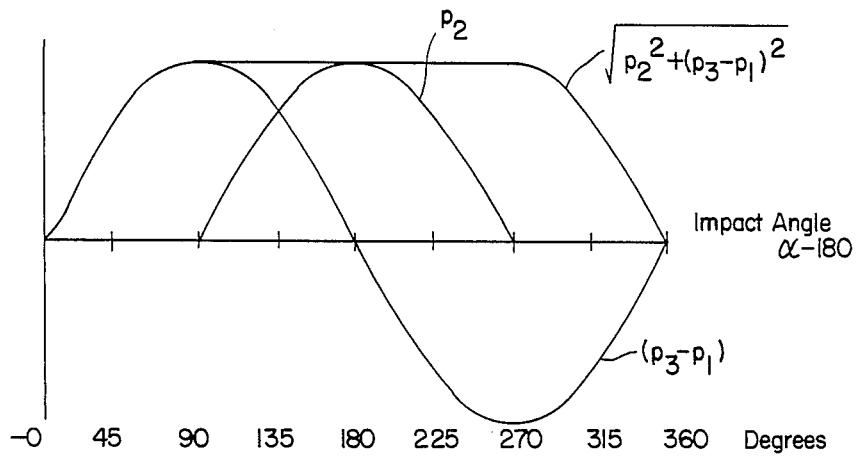
FIG. 26 is a graphical representation of the measured values obtained from this measuring chamber arrangement shown in FIG. 25.

The change of pressure $p_2$ in measuring chamber 203 as a function of impact angle x has a sine shaped curve, as evidenced in FIG. 26. Also illustrated in FIG. 26 is the process of the pressure difference $p_3 - p_1$ as a function of impact angle.

These curves were also obtained through computer simulation.

The third curve shows the process of the magnitude $$p_2^2 = (p_3 - p_1)^2.$$

This magnitude is proportional to the velocity v of the flow relative to the probe. This type of determining of the velocity v can be undertaken within a range of 180 degrees, as is evident from FIG. 26. In FIG. 26 this value is constant up to 270 degrees, across the range x=90 degrees.

With a probe according to this form of execution, the velocity (or the course) may be determined, without the static pressure additionally having to be determined by some other method.

A wide variety of possible applications exists for the probe according to the invention in its various embodiments. Some possibilities for using the probe according to the invention are specified below.

1. Anemometer

The probe according to the invention can be used for measuring the direction and force of wind flows. The probe has no mechanically moving parts and can be constructed to be of ultralightweight. For this reason, it is particularly advantageously applicable to wind measurement on ships. In meteorology, the probe can be used for wind measurement particularly in cases where moisture, low temperatures or high temperatures make it more difficult to use probes with moving parts.

In addition, the electronic measurement signals can be particularly simply evaluated and further processed.

2. Flow and drift meter

For example for ships in water or for aircraft in the air. The probe is used for determining the direction of drift with respect to a desired direction of progress and/or flow.

3. Trim angle meter for aircraft

Two crossed two-chamber probes measure the rotations around the vertical axis or the lateral axis of the aircraft, that is to say changes in the aircraft attitude during flight The trim angle around the lateral axis or the yaw angle around the vertical axis can be measured. The signals obtained provide the pilot with important information.

4. Signal transmitter for yaw dampers in aircraft

5. Pitot tube for aircraft airspeed indicators with large free-stream angle and without dependence on static pressure Pitot tubes have an operating angle of 17 degrees maximum. If, however, for example sports planes fly with sideslip angles which are greater than 15 degrees when maneuvering, Pitot pressure meters no longer operate since the operating angle is exceeded. But the probe according to the invention can be used for detecting any angles. In addition, the probe according to the invention can detect cross-winds, which is of advantage for aircraft which must be independent from control by a tower such as, for example, military aircraft.

6. Sensor for course correction in agricultural spraying planes

Spraying plane pilots must accurately know the direction of spraying, particularly since the chemicals to be sprayed are materials which must only selectively reach the ground. As soon as cross-winds occur, the material to be sprayed is driven away. A probe according to the invention, located on the ground, can transmit measured values with respect to cross-winds occurring up to the spraying plane.

7. Cross-wind warning for motor vehicles

A driver of a passenger car or a lorry, particularly with a trailer, frequently underestimates the presence of cross-winds. A probe according to the invention produces a cross-wind warning when certain wind force is measured. This cross-wind warning signals to the driver that a certain speed must not be exceeded to prevent the vehicle from being displaced on the road-way.

8. Measuring probe for wind tunnels

The position of an object to be measured in a wind tunnel with respect to the flow can be simply measured by means of a probe according to the invention. The measuring probe is small and can be attached to the object to be measured at a place where it will not disturb the flow to be measured.

9. Measuring probe for wind warning devices

Selective direction warnings are possible in a simple manner via the most varied wind warning devices by using the measuring probe according to the invention.

10. Sensor for industrial robots

In recent times, industrial robots are being developed for the most varied fields of application. A robot should be able to recognize as many environmental parameters as possible. For this purpose, the recognition of a flow in space is an extremely advantageous parameter. If, for example, a robot is used for spraying paint, the recognition of cross-winds can correct the spray nozzle carrier to avoid spraying in the wrong direction.

11. Tracking sensor for wind-driven plant

In wind power stations, the flow direction is detected by the probe according to the invention. This can be used for optimizing, for example, the angle of adjustment of the blades, wind wheels, wind turbines and so forth. It must be noted that the probe operates without hysteresis.

12. Signal transmitter for wind compensators for civilian and military applications In the case of ballistic tasks such as, for example, the shooting of rescue lines, ropes, rockets or grenades cross-wind components must be accurately included in the ballistic calculations. A probe according to the invention, measuring in all directions, supplies the required flow values.

13. All-round probe

Arrangements of the probe of the invention in two or three planes are sensitive to flows in vertical and horizontal directions. Such measurements are required, for example, in mountain regions for detecting rising or falling air flows. In this connection, local turbulences can also be detected. In addition such all-round probes are highly useful for weather probes.

14. Compensation transmitter in flows of fluids

In mixing devices, flows from various tubes must be frequently controlled. Using the probe according to the invention, flows from wrong directions can be detected which causes signals to be generated which are used for controlling compensation transmitters. In an embodiment of the probe according to the invention, comprising chambers closed by membranes, the probe can also be used in wet rooms or aggressive media, for example in chemical applications.

While the foregoing invention has been described with reference to its preferred embodiments, various alterations and modifications will occur to those skilled in the art. All such alterations and modifications are intended to fall within the scope of the appended claims.

What is claimed is:

1. Process for measuring the direction and/or the force of a gaseous or fluid flow, utilizing a probe having a first and a second pair of externally opened measuring chambers having equally effective dynamic pressure openings, and lying in the same plane, wherein the chambers of the first pair are located axial-symmetrically opposite each other about their axis of symmetry, and further wherein the chambers of the second pair are positioned essentially ninety degrees to the first pair and wherein the chambers of the second pair are located axial-symmetrically opposite each other about the axis of symmetry, the process comprising the steps of:
   measuring the pressure built up in the two chambers of the first pair;
   determining the differential pressure between the two chambers of the first pair for a first reference pressure;
   measuring the pressure built up in the two chambers of the second pair;
   determining the differential pressures between the two chambers of the second pair for a second reference pressure;
   comparing the first reference pressure with the second reference pressure to obtain the direction of the flow;
   summing the squares of the first reference pressure and second reference pressure to determine the force of the flow.

2. Process according to claim 1, wherein each of the four chambers is formed essentially in the shape of a sector of circle and arranged in such a way that the dynamic pressure openings are located on a circle in a plane, further comprising the steps of converting the first reference pressure into an electronic signal which varies in dependency on the free-stream angle of flow essentially in form of a sine curve and converting the second reference pressure into an electronic signal which varies in dependency on the free-stream angle of flow essentially in form of a cosine curve.

3. Process according to claim 2, wherein the two reference pressure signals are processed electronically in an analog computer, which calculates the arctangent value from the quotient of the sine and cosine signals, which is a measure of the free stream angle of flow.

4. Process according to claim 2, wherein the two reference pressure signals are electronically squared and summed, in order to get a measure of the force of the flow.

5. Process for measuring the direction and force of fluid flows utilizing a probe having a plurality of pressure measuring chambers with dynamic pressure measuring openings positioned relative to each other in a first plane at a fixed angle, wherein at least two of the chambers are exposed to the flow and face in different directions to each other and to the direction of the flow, said probe having pressure measuring devices, the process comprising the steps of:
   measuring the dynamic pressures built up in the chambers exposed to the flow;
   measuring or otherwise determining the differences of said dynamic pressures;
   determining the direction of the flow from the differences of the dynamic pressures;
   measuring the static pressure in those chambers not exposed to the flow;
   determining the total pressure built up in the chambers by summing the dynamic and static pressures;
   determining the force of the flow by mathematically processing the total pressure.

6. Process according to claim 5, wherein the openings of the measuring chambers are rectangular or slot-shaped and are located essentially along an arc or along the periphery of a circle.

7. Process according to claim 6, wherein the measuring chambers are disc-shaped and positioned adjacent to one another along said arc or said circle and each of said measuring chambers shares a common wall with the two adjacent chambers and is positioned at an angle of 45 degrees relative to its two adjacent chambers.

8. Process according to claim 5 wherein an additional plurality of chambers in the probe are arranged in a second plane at right angles to the first plane, and from the differences of the measured dynamic pressures in both planes, the spatial direction of the flow is determined, and from determining and processing the total pressures in both planes, the force of the flow is also determined.

9. Process according to claim 8, whereby from the total pressure and the static pressure, the dynamic pressure is determined and from the dynamic pressure the force of the flow relative to the measuring chambers is determined.

* * * * *